(12) United States Patent
Allington et al.

(10) Patent No.: US 11,725,387 B2
(45) Date of Patent: *Aug. 15, 2023

(54) COUPLING DEVICE, ASSOCIATED PARTS AND A METHOD OF USE THEREOF

(71) Applicant: Coupler Solutions Limited, Wellington (NZ)

(72) Inventors: Christopher James Allington, Leeston (NZ); Andrew Karl Diehl, Christchurch (NZ); Peter John Scott, Christchurch (NZ); Benjamin Woods, Wellington (NZ); James Gray Gibson, Christchurch (NZ)

(73) Assignee: Coupler Solutions Limited, Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,266

(22) Filed: Apr. 19, 2022

(65) Prior Publication Data

US 2022/0325524 A1     Oct. 13, 2022

Related U.S. Application Data

(63) Continuation of application No. 17/466,527, filed on Sep. 3, 2021, now Pat. No. 11,332,935, which is a
(Continued)

(30) Foreign Application Priority Data

Sep. 12, 2016 (NZ) ........................ 724218

(51) Int. Cl.
    *E04C 5/16* (2006.01)
(52) U.S. Cl.
    CPC .................. *E04C 5/165* (2013.01)

(58) Field of Classification Search
    CPC . E04C 5/16; E04C 5/162; E04C 5/163; E04C 5/165; E04C 2002/048; F16B 7/182;
    (Continued)

(56) References Cited

U.S. PATENT DOCUMENTS

| 833,349 A | 10/1906 | Starkey et al. |
| 3,694,012 A | 9/1972 | Gelfand |

(Continued)

FOREIGN PATENT DOCUMENTS

| CN | 204266475 U | 4/2015 |
| DE | 1675007 A1 | 12/1970 |

(Continued)

*Primary Examiner* — Patrick J Maestri
(74) *Attorney, Agent, or Firm* — Holzer Patel Drennan

(57) ABSTRACT

Described herein is a coupling device, associated parts and a method of use thereof. In one aspect, a coupling device is described comprising a sleeve with an inner surface that encloses at least part of at least one elongated element to be coupled; and at least one deformation means fitted with interference between, and causing local deformation about, at least part of the inner surface of the sleeve and/or an adjacent outer surface of the at least one elongated element. A deformation means insertion tool, a coupling sleeve, a deformation means, and a method of coupling at least one element are also described. The described coupling device, associated parts and a method of use offer the ability to couple together different elements in a strong and/or ductile manner, coupling being tuneable as needed to suit the preferred application. The coupling described may overcome art issues associated with bulky size of coupling, in particular, radial protrusion. The coupling may also increase the coupling force therefore increase the load that may be managed across the coupling device. Further, the way the parts are assembled may minimise generation of localised (Continued)

points of stress therefore also increasing the load that may be managed across the coupling device.

20 Claims, 12 Drawing Sheets

Related U.S. Application Data continuation of application No. 16/332,309, filed as application No. PCT/NZ2017/050117 on Sep. 12, 2017, now Pat. No. 11,293,182.

(58) Field of Classification Search
CPC ...... F16B 7/0406; F16B 2/02; F16B 2021/14; F16B 21/12; E05D 2005/145; E05D 5/125; E05D 5/127; E05D 5/128
See application file for complete search history.

(56) References Cited

U.S. PATENT DOCUMENTS

| | | |
|---|---|---|
| 4,127,354 A | 11/1978 | Mixon |
| 4,195,944 A | 4/1980 | Cross |
| 4,469,465 A | 9/1984 | Andrus |
| 4,666,326 A | 5/1987 | Hope |
| 4,997,306 A | 3/1991 | Kunoki |
| 5,046,878 A | 9/1991 | Young |
| 5,606,839 A | 3/1997 | Baumann |
| 5,664,902 A | 9/1997 | Holdsworth |
| 5,746,555 A | 5/1998 | McEvoy |
| 5,909,980 A | 6/1999 | Holdsworth |
| 5,974,761 A | 11/1999 | Mochizuki et al. |
| 6,089,779 A | 7/2000 | Lancelot |
| 6,328,499 B1 | 12/2001 | Reding et al. |
| 6,532,711 B2 | 3/2003 | Gregel et al. |
| 6,679,024 B2 | 1/2004 | Dahl |
| 6,773,198 B2 | 8/2004 | Copping |
| 6,843,031 B1 | 1/2005 | Sorkin |
| 6,860,672 B2 | 3/2005 | Kim |
| 6,925,773 B2 | 8/2005 | Gregel et al. |
| 7,093,402 B2 | 8/2006 | Hopwood |
| 7,107,735 B2 | 9/2006 | Hopwood |
| 7,905,066 B2 | 3/2011 | Pryor et al. |
| 7,975,444 B2 | 7/2011 | Holdsworth et al. |
| 2003/0198513 A1 | 10/2003 | Wang |
| 2004/0238558 A1 | 12/2004 | Froehlich |
| 2005/0072102 A1 | 4/2005 | Hopwood |
| 2005/0169701 A1 | 8/2005 | Kies et al. |
| 2006/0067785 A1 | 3/2006 | Holdsworth |
| 2007/0095013 A1 | 5/2007 | Kerkay |
| 2007/0175167 A1 | 8/2007 | Allen et al. |
| 2008/0060291 A1 | 3/2008 | Braun |
| 2008/0172979 A1 | 7/2008 | Wilson et al. |
| 2008/0245004 A1 | 10/2008 | Pryor et al. |
| 2008/0245128 A1 | 10/2008 | Comerford et al. |
| 2008/0307741 A1 | 12/2008 | Comerford et al. |
| 2009/0308017 A1 | 12/2009 | Kadoya et al. |
| 2010/0024344 A1 | 2/2010 | Murayama et al. |
| 2010/0104357 A1 | 4/2010 | Al-Tuhami et al. |
| 2012/0201597 A1 | 8/2012 | Comerford et al. |
| 2013/0230350 A1 | 9/2013 | Kim et al. |
| 2014/0147198 A1 | 5/2014 | Kim et al. |
| 2015/0056008 A1 | 2/2015 | Comeford et al. |
| 2016/0032589 A1 | 2/2016 | Quinones |
| 2017/0081853 A1 | 3/2017 | Kim |
| 2017/0204608 A1 | 7/2017 | Yang et al. |
| 2018/0051464 A1 | 2/2018 | Griggs et al. |
| 2019/0024375 A1 | 1/2019 | Murdoch |
| 2019/0352905 A1 | 11/2019 | Desheng |

FOREIGN PATENT DOCUMENTS

| | | |
|---|---|---|
| EP | 1898017 A1 | 3/2008 |
| EP | 1979557 B1 | 5/2009 |
| EP | 2050889 B1 | 8/2010 |
| EP | 2055853 B1 | 5/2015 |
| GB | 897822 A | 5/1962 |
| JP | 2009221823 | 10/2009 |
| KR | 20060122168 A | 11/2006 |
| KR | 100837113 B1 | 6/2008 |
| KR | 100984243 B1 | 10/2010 |
| KR | 101132685 B1 | 6/2012 |
| KR | 101160532 B1 | 7/2012 |
| KR | 101259959 B1 | 5/2013 |
| KR | 101374598 B1 | 3/2014 |
| KR | 101514691 B1 | 4/2015 |
| KR | 101519471 B1 | 5/2015 |
| KR | 101547290 B1 | 8/2015 |
| KR | 101552321 B1 | 9/2015 |
| KR | 101563637 B1 | 10/2015 |
| KR | 101584044 B1 | 1/2016 |
| KR | 101595327 B1 | 2/2016 |
| KR | 101602399 B1 | 3/2016 |
| KR | 101654465 B1 | 9/2016 |
| RU | 20329 U1 | 10/2001 |
| WO | 9935354 A1 | 7/1999 |
| WO | 03087492 A1 | 10/2003 |
| WO | 2005061814 A1 | 7/2005 |
| WO | 2006039245 A2 | 4/2006 |
| WO | 2006118385 A1 | 11/2006 |
| WO | 2009017337 A1 | 2/2009 |
| WO | 2009066829 A1 | 5/2009 |
| WO | 2011017765 A1 | 2/2011 |
| WO | 2014123298 A1 | 8/2014 |
| WO | 2016138912 A1 | 9/2016 |

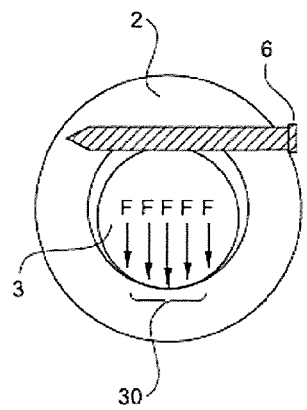 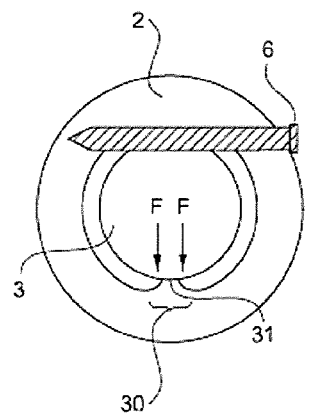 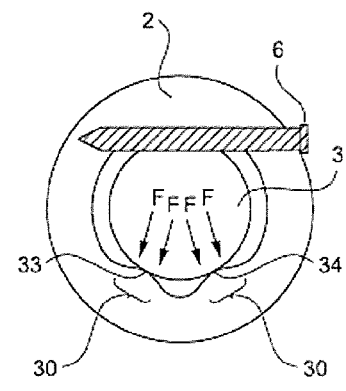
FIGURE 15A     FIGURE 15B     FIGURE 15C
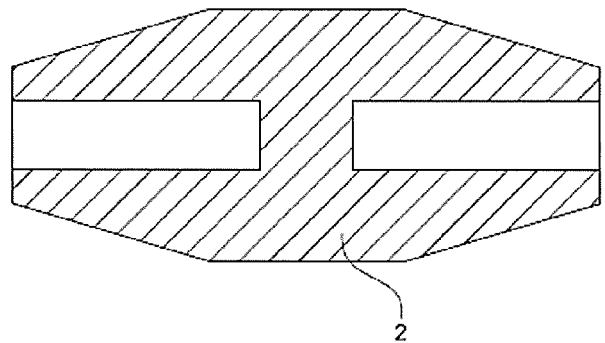
FIGURE 16
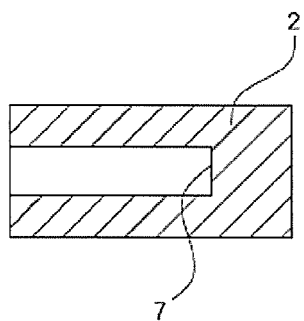 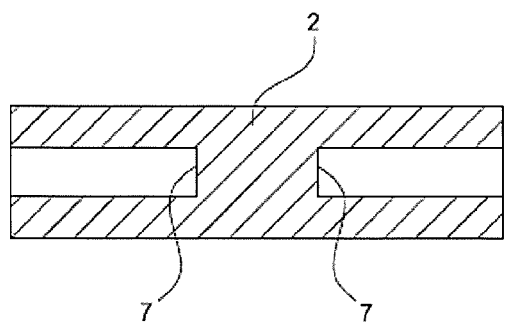
FIGURE 17A     FIGURE 17B

COUPLING DEVICE, ASSOCIATED PARTS AND A METHOD OF USE THEREOF

RELATED APPLICATIONS

This application derives priority from New Zealand patent application number 724218 incorporated herein by reference.

TECHNICAL FIELD

Described herein is a coupling device, associated parts and a method of use thereof. The coupling device may utilise material deformation on assembly in order to achieve coupling.

BACKGROUND ART

In many applications there is the need to join to, or couple with, elements. One such application is in reinforced concrete where reinforcing steel that is placed into the concrete is typically supplied in discrete lengths. There are many locations where the reinforcing steel must continue for a length longer than the discrete length supplied, and it becomes necessary to join multiple lengths together. One means of achieving this is to overlap the reinforcing steel over a long distance and use the surrounding concrete to provide transfer of the loads between the overlapping bars. An alternative means is to use a coupling device to join the bars together in an axial means.

The above application and discussion below refers to reinforcing steel in concrete as a potential application for a coupling device, however, it should be appreciated that many other applications require coupling of elements in an axial manner; such as furniture legs, steel light columns, golf club handles, scaffolding elements, pipes, cables, and so on and reference to reinforcing steel should not be seen as limiting.

The performance requirements imposed on the coupling device elements will be specific to the application in which the coupling device is used. For example, when used to join longitudinal reinforcing bars, the coupling device element(s) must have specific strength, stiffness, robustness, and ductile characteristics. Furthermore, the coupling device or elements thereof will be required to meet dimension requirements.

One key constraint with coupling system design relates to dimensional size. When coupling longitudinal reinforcing bars in a reinforced concrete application for example, it is ideal for the coupler to meet specific dimensional requirements. If the outside dimension of the body of the coupling device or part thereof, when installed on the reinforcing bar, is no greater than the thickness (diameter) of the transverse reinforcing bars, then the coupling device or part thereof will not protrude beyond the reinforcing bar cage, the cage being the combination of longitudinal and transverse reinforcing bars in a concrete element. This then allows the cage to be manufactured to the extreme limits allowable by the reinforced concrete member dimension and cover concrete thickness. If the coupling device or part thereof does protrude beyond the transverse steel, then it may corrode or cause corrosion of the other elements in the reinforcing bar cage. As such it can then be necessary to reduce the dimensions of the cage to ensure an adequate cover concrete thickness is maintained. This in turn reduces the efficiency of the reinforced concrete element and places an impairment on the efficiency of the system.

A further key constraint with coupling system design relates to the coupling device length. The maximum length of the coupling device or part thereof is ideally less than the spacing of the transverse steel bars along the longitudinal member. This allows the coupling device to fit between the transverse bars without interfering with their placement (typically 150 mm or greater). If the length of the coupling device is too long, then a transverse steel bar is required over the coupling device which in turn requires fabrication of a special transverse bar set. Longer length also necessitates a reduction in the spacing of the longitudinal bars to ensure this special transverse bar does not protrude into the cover concrete region. Alternatively, if the coupling device is longer than the spacing between the transverse bars, it is preferable that an existing transverse bar be placed over the coupling device in order to avoid reducing the efficiency of the structural system or encroaching on the cover concrete distance. This constraint may constrain structure, design and/or increase cost.

Another design constraint is axial stress. Once fabricated, the reinforced concrete element will be subjected to some applied loading which will place the coupled reinforcing bar into a state of axial stress.

Under static loading this will typically be a tensile stress or a compressive stress. In concrete elements subjected to fluctuating loads (thermal loads, traffic load, earthquake loads), the coupled steel bar may be subjected to cyclic tensile stresses, cyclic compressive stresses, or stresses that cycle between the tension and compression domains. The level of stress imposed on the coupled element will also vary depending on the chosen application. In some applications the coupled element will become elongated when subjected to elastic stresses, whereby once the load is removed the element returns back to its original length. In other situations the coupled elements may be subjected to plastic stresses, whereby, when the loading is removed, the element is permanently deformed or changed. For example, under loading imposed by a large earthquake, a concrete element may become cracked and deformed. This may require the coupled steel reinforcing bar to stretch to a high level of plastic strain. The coupling device will be required to have sufficient capacity to resist the full range of likely stresses and strains that may be imparted when in use.

A further design issue associated with axial stress is material change in dimension in an opposing direction due to Poisson's effect. This Poisson's effect can make it difficult to couple to a material under high levels of axial tension stress because the high strain in the direction of load will result in a large reduction in cross sectional area. This will result in the relative diameter of the coupling device to that of the coupled element to decrease under load, thereby increasing the difficulty of maintaining a high coupling capacity.

Further complicating the design is that different materials have a different relationship between the stress and strain and this relationship also varies somewhat depending on the type of loading applied, the speed of the loading application, the duration of the loading, and the nature of the loading. For example, the basis relationship between the stress and strain of a steel element when subjected to a uniaxial tension load is as shown in FIG. 1. As is observed in FIG. 1, the relationship between stress and strain can be non-linear. Ideally, the coupling device performance simulates the exact properties of the uncoupled material. In this event, the stress-strain relationship measured across the coupled region would closely match that of an uncoupled, continuous reinforcing bar. This provides considerable advantages to the end user as it allows the coupling devices to be installed in any location without influencing the relative behaviour of the reinforced concrete member under load. For this to occur the coupled region must limit any potential movement between the coupled elements as this would result in an increased displacement and therefore produce a higher effective level of strain (being the change in length divided by the original length) across this region. Likewise, the coupled region can be significantly stiffer than the uncoupled regions as this will reduce the relative strain in this region.

A further design constraint is to avoid weakening the coupled elements about the coupling region. Ideally, the coupling device should have sufficient strength so as to force any region of failure away from the coupling region. For example, in a reinforcing bar subjected to high level of axial load, the coupling device should have sufficient strength to force the reinforcing bar to fracture away from the location of the coupling device. This is of particular importance in certain applications, such as reinforced concrete elements used in earthquake prone regions where the reinforcing bar can be subjected to high levels of induced plastic stress and associated strain.

The majority of the examples used above have referred to the coupling or two elements in an axial manner. It should be appreciated that it may also be necessary to couple more than two elements together, such as the formation of T-junctions or Y-junctions. Equally, there are applications when it is not required to join multiple elements but it may be useful to join a specific detail or feature onto a single (or more) element. This may include coupling a larger diameter end stop on the end of a furniture leg to reduce the pressure the leg places on the ground or preventing damage to the floor material, or joining a specific detail to the a reinforcing bar so as to increase its functionality.

It should also be appreciated that there are applications when the elements required to be joined differ in shape and size. Using the example of a reinforcing bar, this may include joining bars of different cross sectional area, different shape, or different grades of material, or different deformation patterns.

Based on the inventors' experience, art coupling devices have limitations and drawbacks associated with one or more of the above design constraints that comprise the art device performance and versatility. Offering an alternative design that addresses some or all of the above constraints or at least offers the public a choice may be useful.

Further aspects and advantages of the coupling device, associated parts and a method of use thereof will become apparent from the ensuing description that is given by way of example only.

SUMMARY

Described herein is a coupling device, associated parts and a method of use thereof.

In a first aspect, there is provided a coupling device comprising:
 a sleeve with an inner surface that encloses at least part of at least one elongated element to be coupled;
 at least one deformation means fitted with interference between, and causing local deformation about, at least part of the inner surface of the sleeve and/or an adjacent outer surface of the at least one elongated element.

In a second aspect, there is provided a deformation means insertion tool, the tool comprising a driving mechanism to fit or force a deformation means into an interference fit between mating interference components, the tool providing support to at least the outer portion of the mating interference components as the deformation means is fitted.

In a third aspect, there is provided a coupling sleeve, the sleeve comprising:
 a generally elongated shape with an opening therein the sleeve having an inner surface and the inner surface shape generally complementing the shape of at least one elongated element to be coupled; and
 wherein the sleeve has at least one orifice extending from the exterior of the sleeve to at least one groove or marking recessed into the sleeve inner surface.

In a fourth aspect, there is provided a deformation means used to fit with interference between, and cause local deformation about at least part of the inner surface of the sleeve and/or an adjacent outer surface of the at least one elongated element to which the deformation means is fitted, thereby causing coupling of the sleeve and at least one elongated element, the deformation means comprising:
 (a) a pin wherein the pin has a greater hardness than the opposing elements; and
 (b) wherein the pin is formed so as to provide a self-energising action when fitted, acting to increase the interference with, and therefore interlocking of, the coupled opposing elements when subject to external loading.

In a fifth aspect, there is provided a method of coupling at least one element, the method comprising the steps of:
 (a) fitting a sleeve at least partially over at least part of at least one elongated element;
 (b) fitting at least one deformation means between the sleeve and at least part of the elongated element;
 wherein the at least one deformation means fits with interference between the sleeve and at least one elongated element and, when fitted, the at least one deformation means causes local deformation to at least part of the inner surface of the sleeve and an adjacent outer surface of the at least one elongated element.

In a sixth aspect, there is provided a coupling device comprising:
 a sleeve with an inner surface that encloses at least part of at least one elongated element to be coupled;
 at least one elongated element, the at least one elongated element comprising at least one pre-formed indentation and/or indentation formed through combinations of material removal and material deformation orientated during coupling to be coincident with at least one orifice in the sleeve; and
 when coupled, at least one deformation means engage through the sleeve orifice and along the elongated element indentation.

The above described coupling device, associated parts and a method of use thereof offer the ability to couple together different elements in a strong and/or ductile manner, coupling being tuneable as needed to suit the preferred application. Further advantages and improvements will become apparent from the detailed description below.

BRIEF DESCRIPTION OF THE DRAWINGS

Further aspects of the above described coupling device, associated parts and a method of use thereof will become apparent from the following description that is given by way of example only and with reference to the accompanying drawings in which:

FIG. 15A,B,C illustrate how the interface force may be modified through varying sleeve geometry;

FIG. 16 illustrates a schematic view of a varied sleeve structure;

FIG. 17A,B illustrate schematic views showing variations in sleeve shape and configuration;

DETAILED DESCRIPTION

Figure 1:
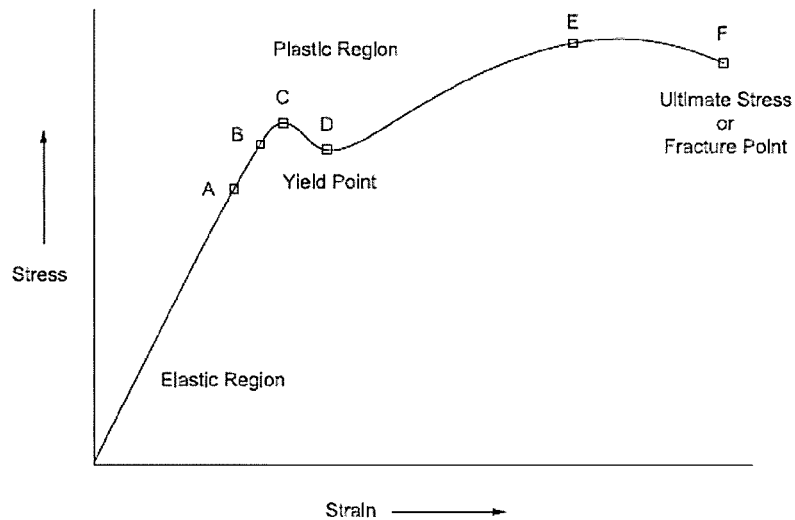
FIG. 1 illustrates a typical stress versus strain curve fora material.

As noted above, described herein is a coupling device, associated parts and a method of use thereof.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'deformation' or grammatical variations thereof refers to displacement of material as a result of elastic and/or plastic movement of the material acting to change the shape and/or remove part of the material.

The term 'deformation means' or grammatical variations thereof refers unless otherwise noted below, to an item or feature on an item that deforms itself or causes deformation of the material of another item or feature.

The term 'local deformation' or grammatical variations thereof refers to the localised displacement of material in the region adjacent to the position of the deformation means. This may occur as a result of the position of at least one deformation means occupying a spatial volume otherwise occupied by the adjacent member material.

The term 'pin' or grammatical variations thereof refers to an element of slender aspect for placement about and/or between another object for the purpose of connecting the pin and another object, or holding the position of other elements relative to each other utilising the pin as a holding means.

The term 'fit' and 'install' or grammatical variations thereof may be used interchangeably herein to refer to the process and/or timing of causing coupling to occur using the device.

The term 'once fitted' or 'once installed' or grammatical variations thereof may be used interchangeably herein to refer to the position of at least one deformation means post coupling assembly.

In a first aspect, there is provided a coupling device comprising:
  a sleeve with an inner surface that encloses at least part of at least one elongated element to be coupled;
  at least one deformation means fitted with interference between, and causing local deformation about, at least part of the inner surface of the sleeve and/or an adjacent outer surface of the at least one elongated element.

In the above aspect, the at least one deformation means may be fitted directly between at least part of the inner surface of the sleeve and an adjacent outer surface of the at least one elongated element. That is, the at least one deformation means directly abuts both the sleeve and elongated element and no intermediate member lies between the deformation means and either the sleeve or elongated element. Direct abutting of the deformation means on the sleeve and/or elongated element may not be essential and alternatively, indirect abutting e.g. via an intermediate member as described further below may also be possible.

Local deformation as noted above may be generated on installation of the deformation means via use of an impulse energy input to forcibly insert the deformation means to be inserted into at least part of the inner surface of the sleeve and/or an adjacent outer surface of the at least one elongated element. That is, the act of insertion causes interference and local deformation between the at least one elongated element, the at least one deformation means and the sleeve. The level of force required to insert the deformation means may be a function of the degree of interference and/or the size of the deformation means. Multiple methods may exist to insert the deformation means comprising for example: high energy projectile force, impulse force, percussion, screwing (twisting), continuous pressure (such as a press), compressed air, rapid combustion or explosive activation, and combinations thereof. The use of high energy impulse installation methods, such as powered activation allow for rapid installation times, little required effort by the user and can be achieved with portable hand held devices. In one embodiment, the at least one deformation means may be provided with sufficient impulse energy to travel at a velocity of at least 50, or 75, or 100, or 125, or 150, or 175, or 200, or 225, or 250, or 275, or 300 m/s at the moment of entry into the coupling device or a part thereof. As should be appreciated, the term 'impulse energy input' may refer to a single impulse or multiple energy impulses. Further, as should be appreciated, an impulse energy input for the purposes of this specification may exclude threading or screwing the deformations means into the coupling or a part thereof although some degree of deformation means rotation during fitting may occur. Instead of helical threading, the at least one deformation means may predominantly slide between the sleeve and elongated element during fitting moving obstructing material away from the deformation means path of travel. The high energy of fitting may be useful in order to impose the described local deformation. Without being bound by theory one reason for the effectiveness of the coupling produced may be that during insertion and under the high energy conditions noted, the material being deformed locally may become temporarily fluid in nature hardening once the energy dissipates to a more cohesive interface than may be the case under low energy plastic deformation e.g. threading a screw into the elongated element.

Deformation may not occur at a time or moment post installation such as in response to a force acting to decouple the members. Alternatively, a first deformation occurs on installation and additional deformation may occur at a time post install such as on application of a force. The force may be a tension or compression force.

The sleeve and the at least one elongated element may be generally coaxially aligned when coupled together. Eccentric alignment may also be possible and still achieve similar outcomes.

Local deformation of the sleeve and/or at least one elongated element may be predominantly plastic deformation. Local deformation may also occur to the at least one deformation means during installation. Local deformation of the at least one deformation means may be elastic deformation, plastic deformation, or a combination of both elastic and plastic deformation.

The at least one deformation means may have an elongate form with a body and opposing ends. The body may in one embodiment be a slender member with a common shape along the body length e.g. a common circular diameter. The at least one deformation means body may provide substantially all of the interference with at least part of the inner surface of the sleeve and/or an adjacent outer surface of the at least one elongated element. The at least one deformation end or ends once the deformation is fitted, may either not interfere at all with the sleeve or elongated element or may not interfere in a way that influences coupling. The inventors have found that by inserting the deformation means 'sideways' between the sleeve and elongated element, the deformation means can be driven forcibly between the sleeve and elongated element and the resulting local deformation that occurs on the sleeve and/or at least one elongated element may be along the interface between the length of the deformation means i.e. where the side of the deformation means abuts the sleeve and/or elongated element. This results in a greater coupling surface area and therefore greater coupling force achieved than if a direct end only local interference were achieved. Point loadings such as end on art examples may also introduce localised forces on the elongated element when traction is applied, these localised forces typically being points of ultimate failure or stretch/elongation. The sideways alignment spreads the load about the elongated element and sleeve walls and therefore increases coupling force and resistance to localised force loadings.

The at least one deformation means may have a greater hardness than the sleeve and/or at least one elongated element. The deformation means may have sufficient hardness such that, when the deformation means and sleeve/elongated element interact, the deformation means generates localised deformation of the elongated element and/or sleeve while the deformation means remains substantially unaffected in form or shape.

The elongated element may be a slender elongated element such as a rod, tube or cylinder. One example of an elongated element may be a length of reinforcing rod although as noted in other parts of this specification, almost any elongated element may be used. The elongated element may have a first end and a second end and one or both ends may have a coupling device incorporated thereon.

It will be appreciated that the elongated element is formed with a mid-section located between a first end and a second end. In one embodiment coupling of at least one sleeve to the mid-section of the elongated member may be achieved with the coupling device described. That is, the coupling device sleeve may be slid over the elongated element for example until it covers a region of the mid-section and the sleeve may be coupled to the elongated element at this point. Alternatively, the sleeve may be slid over an end as noted above or, for a longer sleeve, slid over an end and well into the mid-section. One skilled in the art will appreciate that mid-section coupling may be desirable for any number of reasons. Any combination of end-coupling and mid-section coupling may be achieved.

The elongated element may have varying cross-sectional shapes. Circular or rounded shapes such as elliptical forms are common in the art however polygonal shapes such as triangles, squares, rectangles, pentagonal shapes and so on may also be used in the coupling device described herein. Reference may be made hereafter to terms inferring a circular cross-section such as diameter, axis, circumference, and so on.

These terms should not be seen as limiting since, as noted here, the cross-section shape of the elongated element (and also optionally, the sleeve) may vary and need note be circular specific.

The sleeve may have an inner surface shape that in one embodiment generally complements that of the at least one elongated element to be coupled. As noted above, this may result in coaxial placement although other placements may be possible. In this embodiment, when the coupling device is formed, a face of the elongated element may abut a face of the sleeve interior as the at least one deformation means imposes a force about the opposite side(s) of the elongated element. As may be appreciated, the interior shape of the sleeve could be varied in order to alter where the elongated element abuts the sleeve interior. For example, the sleeve interior wall may be hollowed out about the region where abutment would normally occur. By doing this, the elongated element then abuts either side of the hollowed out portion thereby having two abutting faces against the sleeve interior. If the two abutting faces are positioned opposite each other and within a 180 degree arc, a wedging effect may result of the elongated element being wedged between the two opposing faces.

The sleeve may be manufactured from a material with different material properties to the elongated element(s) as a means of enhancing coupling between the sleeve and elongated element(s). The sleeve may be manufactured from a material with different toughness properties to the elongated element(s). An example may be to use a lower strength steel as the sleeve material but one which has increased elongation capacity. When the elongated element(s) is subjected to tension, for the same level of load, the sleeve would achieve a greater strain and therefore be subject to increased Poisson's effect, and an associated reduction in internal dimension, compared to the elongated member(s). This may increase interference between the sleeve and the elongated element(s). The opposite relationship may also be used to decrease interference between the sleeve and the elongated element.

In one embodiment, the deformation means when fitted may pass through at least one orifice extending from the exterior of the sleeve to the sleeve inner surface. The deformation means when fitted may pass through at least one groove recessed into the sleeve inner surface. When fitted, the at least one deformation means may pass through the at least one orifice and along at least part of the at least one groove assuming both the orifice and groove are present. The at least one deformation means itself may produce the form of all or part of the at least one orifice and/or at least one groove e.g. on coupling, forming an orifice and groove into the sleeve and elongated element. Alternatively, the at least one orifice and/or at least one groove may be formed in part or in full before coupling, for example by pre-drilling an orifice and/or groove prior to insertion of the at least one deformation means. The term 'drilling' or grammatical variations as used herein refers to the use of material removal in the sleeve material to achieve a desired form. Where pre-drilling occurs, the orifice and/or groove may be under or over sized relative to the deformation means so as to change the coupling characteristics. Net-form processing may also be used instead of or with drilling. Net-form processing may for example comprise casting, moulding or sintering and refers to process where the shape is generated through the manufacturing process of the sleeve. As may also be appreciated from the above, the orifice or groove may be pre-formed at least in part and the alternate (groove or orifice) may be formed during insertion of the deformation means.

In one embodiment, each orifice may be coincident with a groove. Further, each orifice may be approximately tangential with a groove.

The at least one groove may in one embodiment, extend about at least part of the inner surface of the sleeve and the remainder of the inner surface remain unformed. The at least one groove may be extended to proceed in a path that is in a direction defined to achieve the desired coupling effect. In one embodiment, the groove may proceed around the entire circumference, surface length or generally about the inner surface of the sleeve.

In another embodiment, the orifice may form a tangential groove for only a short portion of the inner surface of the sleeve, and terminate about at least part of the inner surface.

The above described grooves may provide a directing path for the deformation means during fitting or installation. The lower resistance path defined by the groove may tend to encourage deformation means movement about the groove as opposed to the surrounding area.

The at least one orifice and/or at least one groove may be covered or otherwise obscured and/or protected. Covering may be completed irrespective of the deformation means being in place or not. Covering may be completed using a sealing film, putty, skin or other compound that substantially prevents egress or ingress of materials across the covering. Alternatively a sleeve or similar may be placed over the sleeve to cover the deformation means and/or orifice. Further or alternatively covering may be made over the end opening of the sleeve to prevent egress or ingress of material in the coupled region. Covering may be performed or placed before fitment of the elongated member to the sleeve and/or deformation means. Covering may be useful for example in a reinforcing rod embodiment where the coupling device is to be embedded or placed within concrete. Covering any openings in the coupling device minimises risk of concrete entering the coupling device or a part thereof and therefore prevents compromising any camming action or movement of the at least one deformation means when subjected to a force such as a tension or strain force. Covering(s) may not be essential and may be dependent on the end application of the coupling and force requirements desired from the coupling device.

In one embodiment during fitting, the at least one deformation means may pass about the outer face of the at least one elongated element via the orifice in the sleeve, such that the at least one deformation means may be forced to interfere with the at least one elongated element tangentially. In the case of a round/semi-round elongated element and/or interfere with flat faces and/or apexes or other features of polygonal shaped elongated elements.

The path of the at least one deformation means relative to the sleeve and at least one elongated element once fitted may in one embodiment be predominately orthogonal to the sleeve longitudinal length and the at least one elongated element longitudinal length. The term predominantly in this embodiment refers to the deformation means optionally not being purely orthogonally orientated and instead being about 1, or 2, or 3, or 4, or 5, or 6, or 7, or 8, or 9, or 10, or 11, or 12, or 13, or 14, or 15, or 16, or 17, or 18, or 19, or 20, or 21, or 22, or 23, or 24, or 25, or 26, or 27, or 28, or 29, or 30, or 31, or 32, or 33, or 34, or 35, or 36, or 37, or 38, or 39, or 40, or 41, or 42, or 43, or 44, or 45, or 46, or 47, or 48, or 49, or 50, or 51, or 52, or 53, or 54, or 55, or 56, or 57, or 58, or 59, or 60 degrees offset relative to a purely orthogonal plane. For example, the at least one deformation means may be a series of pins or nails, each of which is inserted tangentially and general orthogonally to the longitudinal length of the elongated element between the sleeve interior face and elongated element.

Alternatively, the path of the at least one deformation means relative to the sleeve and at least one elongated element once fitted may be predominantly in-line with the sleeve longitudinal length and the elongated element longitudinal length, i.e. along the longitudinal axis. In this instance, predominantly refers to the deformation means optionally not being purely aligned with a longitudinal axis and instead being about 1, or 2, or 3, or 4, or 5, or 6, or 7, or 8, or 9, or 10, or 11, or 12, or 13, or 14, or 15, or 16, or 17, or 18, or 19, or 20, or 21, or 22, or 23, or 24, or 25, or 26, or 27, or 28, or 29, or 30, or 31, or 32, or 33, or 34, or 35, or 36, or 37, or 38, or 39, or 40, or 41, or 42, or 43, or 44, or 45, or 46, or 47, or 48, or 49, or 50, or 51, or 52, or 53, or 54, or 55, or 56, or 57, or 58, or 59, or 60 degrees offset to a purely longitudinal axis. In this embodiment, the at least one deformation means may for example be a threaded pin or nail that is inserted from a first side of the sleeve between the sleeve interior face and elongated element.

The deformation means may insert straight between the sleeve and elongated element. Alternatively, the at least one deformation means may vary in path about the sleeve and elongated element. In one example, the straight path may be a tangential path either orthogonal to or axial to the longitudinal axis of the elongated element, the deformation means for example retaining a generally straight form that is interposed between the sleeve and elongated element. Reference to tangential path should not be seen as limiting to a round cross-section shaped sleeve and/or elongated element as the deformation means path may for example interpose with apexes or valleys of a non-rounded cross-section shape elongated element and/or sleeve. An example of a varied deformation means path may be a path that changes direction such as rounded, circular, polygonal, or helical paths. The path chosen may be one that follows the shape of the elongated element and/or sleeve such as the cross-section shape of the elongated element.

The at least one deformation means may extend through an orifice in an opposing side of the sleeve once fitted. In an alternative embodiment, the opposing side orifice may be a blind hole. In this embodiment, a groove around the inside surface of the coupler sleeve may not be necessary with the deformation means simply passing in a straight line between the sleeve elongated element(s).

In an alternative embodiment, the at least one deformation means remains within the sleeve once coupled. That is, the deformation means may not protrude from the sleeve once fitted. The at least one deformation means may in the embodiment bend to follow the approximate form of the outer surface of the at least one elongated element once fitted. Bending may be guided by the pathway of the groove in the sleeve. Alternatively, the at least one deformation means may be forced around the circumference of the at least one elongated element and at least partly perpendicular to the longitudinal axis of the at least one elongated element once fitted. In a further alternative the at least one deformation means may be forced around a curvilinear pathway defined by the at least one groove during fitting. The at least one deformation means may be forced axially between the at least one elongated element and the sleeve. The curvilinear pathway may be helical although a pure helical path is not essential. For clarity, the term 'curvilinear' may refer to the groove being formed around the inside of the sleeve also translating along at least part of the longitudinal length of the sleeve as part of the groove path. The groove path may be regular or irregular.

A plurality of deformation means may be inserted to couple the at least one elongated element and sleeve.

The groove geometry may be varied to cause the at least one deformation means to undergo a further energisation as the at least one elongated element undergoes deformation. The term 'energisation' as used herein may refer to a change in insertion energy when the at least one deformation means is fitted or alternatively, a change in strain energy of the at least one deformation means when the coupling undergoes a force loading. For example, the groove may vary in geometry to present regions of lower or higher resistance to movement of the deformation means during installation and so, in lower resistance regions, allowing greater energisation and hence insertion energy than higher resistance regions. In an assembled coupling device, the at least one deformation means may be energised for example to vary or achieve particular elongated element material flow about the deformation means. Varying deformation means energisation may tailor or tune the coupling properties.

The deformation means may be formed so that during or after install/coupling, the deformation means acts to enhance the interference and interlocking of the coupled system when subject to external loading. That is, the deformation means interacts with the other elements to provide the interference.

For example, the deformation means may be formed with a leading end detail that facilitates:
  Installation of the deformation means in a corresponding orifice in a sleeve; and/or
  travel of the deformation means around a groove optionally located on part or all of the inside of the sleeve; and/or
  a flow of material in the zone of localised deformation of the elongated element and/or sleeve;
  a cutting detail or details on the deformation means such as a serrated edge that may for example shave material from the elongated element during coupling.

It may be appreciated that the deformation means may be formed with a combination of end detail features, and that the above list of end detail is not limiting.

Further, the deformation means either at the leading end detail or at other points along the deformation means may have a part of the deformation means deform (or deform differently) to other parts of the deformation means e.g. a variation on the deformation means diameter or shape about a point or points along the deformation means length.

Note that reference above to the term 'leading end' assumes the deformation means has an elongated form with a first leading end that leads or is inserted first during coupling.

The deformation means may at least in part be self-energising where self-energising occurs from movement of the deformation means as external loading is applied to the coupling device such that the deformation means acts to modify interference between the deformation means and the elongated element and/or sleeve and apply varying pressure to the opposing side element-to-sleeve interface. For example, in one embodiment there may be variation in the geometry of a groove to allow the at least one deformation means to undergo a further energisation as the elongated element undergoes axial deformation. In one configuration, the groove may be formed with a ramped lead-out in the axial direction of the elongated element. When subject to axial deformation, the elongated element would drag the deformation means up the ramped portion, resulting in the deformation means constricting down onto the elongated element. Depending on the chosen geometry, this may increase the interference with the elongated element, decrease it, or alternatively compensate for the sectional reduction due to Poisson's effect. Other groove geometries may be useful in achieving this result, such as a groove and deformation means of differing radius, or cam profiles for example. In an alternative configuration, the deformation means and groove geometry may be formed such that the deformation means is rectangular in cross-section and the groove is a V formation. Axial displacement of the elongated element when placed under strain results in rotation of the deformation means, embedding the edge of the deformation means further into the elongated element. As with the above, this may increase load capacity of the interface and allow for compensation against Poisson's effect. As will be appreciated by one skilled in the art, other deformation means shapes may be employed to achieve the same behaviour and reference to a deformation means of rectangular cross-section and a groove of V formation should not be seen as limiting.

The above noted self-energising action or facilitation may have the advantage of reducing the energy required to install the deformation means. The facilitation may reduce stress concentration in the localised deformation zone. The facilitation may enhance the interference pressure between the sleeve, the deformation means, and the elongated element. The deformation means may be formed with a surface finish and/or features that enhance at least one characteristic of: installation force, friction, friction welding, load transfer capability, traction effects, and combinations thereof.

In an alternative embodiment there may be a variation in the groove geometry that allows the deformation means to translate with axial elongation of the elongated member for a defined distance without providing additional energisation. The defined distance may be determined by the geometry of the groove. In this embodiment, the deformation means may translate through the predefined distance before being restricted in movement and providing resistance to further translation. Resistance to further motion may be a rigid abutment at the groove extent or may be a region of the groove whereby the deformation means undergoes self-energisation. Self-energisation may be achieved through any of the means described within this specification. It is the inventor's understanding that the use of a groove and deformation means interaction may be useful to allow for axial translation of the elongated member in applications where controlled movement is desired. Alternatively the inventor's envisage that such a groove and deformation means interaction may be beneficial for example when used in an array of deformation means, allowing for a defined level of extension of sections of the elongated member under elastic and/or plastic deformation before load transfer occurs via the deformation means. Such an array may use any combination of translating, self energising, or fixed deformation means actions.

When configured in an array, any combination of deformation means energisation and self-energisation characteristics may be employed.

The deformation means may have different physical properties to the sleeve and/or elongated element that are utilised to cause coupling. The deformation means may have an interaction between toughness/impact resistance and hardness that differs to the sleeve and/or elongated element.

As may be appreciated, material toughness and impact resistance are fundamentally referring to the same material characteristics—that is the capability of the material to withstand a suddenly applied load expressed in terms of energy. Both toughness and impact resistance are measured the same way via either a Charpy test or an Izod test. Hardness refers to the resistance of a material to plastic deformation when a compressive force is applied. One measure of testing hardness is the Rockwell scale.

The interaction noted of toughness or impact resistance and hardness as it applies to the described coupling device may specifically relate to the deformation means toughness/impact resistance and hardness when subjected to strain force, particularly a strain force that either exceeds or gets close to the transition zone of the deformation means/sleeve/elongated element from elastic to plastic deformation. Toughness/impact resistance and hardness may for example also be a characteristic when driving or coupling the deformation means with the sleeve and elongated element.

The inventors have found that the interaction between toughness/impact resistance and hardness of the deformation means versus the sleeve and/or elongated element may be an important characteristic. If for example, the deformation means toughness and hardness is not at a desired level relative to the sleeve and/or elongated element, the deformation means may break or fracture on coupling resulting in poor or lower than anticipated coupling device resistance to a strain or traction force. At an extreme, a low toughness/impact resistance and hardness interaction of the deformation means relative to the sleeve/elongated element may result in the deformation means not causing local deformation or in worst cases not even being capable of insertion/coupling between the sleeve and elongated element.

As noted, the interaction between toughness/impact resistance and hardness may be deformation means relative to the sleeve or the elongated element or both the sleeve and elongated element. As noted in discussion elsewhere in this document, the sleeve may have pre-formed grooves that define a path of travel for the deformation means and the interaction noted may only be relevant as results between the deformation means and elongated element. The sleeve itself may have a particular interaction of toughness/impact resistance and hardness that for example is softer or less tough than the deformation means or equally, the sleeve may have a toughness or hardness interaction that exceeds that of the deformation means. Similar characteristics may exist for the elongated element as well. As may be appreciated, it is possible to adjust the interaction of material toughness/impact resistance and hardness to impose varying local deformation properties on the coupling device parts, be that the sleeve, deformation means and elongated element.

As should be appreciated, the exact toughness and/or hardness of the at least one deformation means may be varied depending on the sleeve and/or elongated element material toughness and/or hardness.

To illustrate this point, in a reinforcing rod embodiment where the coupling device comprises a sleeve and where the elongated element is reinforcing rod, it may be desirable to have materials of high toughness at levels of high hardness. The deformation means toughness or impact resistance as measured via a Charpy or Izod test may be at least approximately 40 Joules, 120 Joules, or 160 Joules. These values of toughness may be for deformation means with hardness greater than approximately 45 Rockwell C, 50 Rockwell C, or 55 Rockwell C. The examples given are for an application of a reinforcing rod coupling embodiment. As will be appreciated by one skilled in the art of material selection and material properties, values of toughness and hardness may vary for other applications of the invention disclosed.

In one embodiment, when fitted, the at least one deformation means may also cause at least a portion of the at least one elongated element to displace within the sleeve. The direction of displacement may be non-specific or may be in a specific direction. This may cause at least part of the at least one elongated element to be urged against the inner surface of the sleeve in turn causing the generation of a tractive force in the axial direction of the at least one elongated element due to effects of friction resulting from the interface pressure. The tractive force may add to the coupling strength.

In the above embodiment, the at least one elongated element may be displaced in a direction approximately perpendicular to the at least one elongated elements longitudinal axis.

At least one friction modifying means may be incorporated in the above embodiment. For example, high friction surfaces on the deformation means and/or sleeve surface may be used. An aim of using a high friction surface may be to enhance the magnitude of the friction effect and thereby further increase the tractive force. The friction modifying means may be achieved through a variety of methods, for example including etching, keying or roughening of at least part of the deformation means and/or sleeve surface. The elongated element may also be modified in shape or form to modify the friction about the coupling position. The friction modifying means may for example be achieved through yet further alternatives. In one embodiment the use of an interfacing material may be provided. The interfacing material may optionally have a greater friction coefficient in combination with either or both the elongated member and sleeve inner surface than that of the elongated member bearing directly on the sleeve inner surface. This interfacing material may be achieved either through providing a separate material component, or through providing a plating or coating of the interfacing material directly to the sleeve inner surface. In a further embodiment, the interfacing material may be a protrusion such as a rib or bulge in the interior wall of the sleeve that the elongated element abuts.

Other methods of increasing the traction may be employed. For example, the forming of a thread form on the inner surface of the sleeve may be provided to interact with the elongated member upon fitment of the deformation device. The thread form may result in reduced initial interfacing surface area and providing an increased pressure at the interfacing contacts. The increased pressure may result in localised plastic deformation providing a mechanical interlocking of the elongated member to the sleeve. In an alternative embodiment, the thread form (typically a helical pattern) may be substituted for concentric features to provide a similar effect. Alternatively, similar features may be variable in form and position, either ordered or random in nature. The specific geometrical form may be optimised to increase or maximise the traction force. An increased traction force may provide for a reduced coupled length and/or number of deformation means needed to achieve a specific connection strength. Alternatively, the specific geometric form may be optimised for the purpose of allowing for maximum elongation of the elongated element before rupture, elongation being the axial stretch in the elongated element due to the application of an axial load. In a further variation, the specific geometric form may be generated to provide for a specific distribution of traction force with respect to the axial length along the sleeve.

The use of particles may alternatively or additionally be used to increase the traction effect. The use of particles harder than the elongated element and/or sleeve for example may result in embedment of the particle in both the elongated element and the sleeve inner surface upon application of pressure at the interface. This embedment may provide an interlocking action increasing the traction. The particles may be ceramic, metallic, non-metallic, or any other compound that provides the embedment effect. Non-limiting examples may for example comprise dust or particles formed from diamond, silicon carbide, cubic boron nitride, aluminium oxide, steel such as hardened steel and so on. These particles may be positioned at the time of coupling/assembly of the elongated element to the sleeve, either as loose particles or particles suspended in a medium. Particles suspended in a medium may be painted, poured, or coated onto the interface surface or surfaces. The particles may be pre-coated onto the inner surface of the sleeve prior to fitment of the elongated member.

In an alternative embodiment, the use of alternative cross-sectional forms may be used to enhance the tractive force for a fixed value of interference force provided by the deformation means. In one example, a cross-section detail may be used where at least two interfacing regions between the elongated element and the sleeve inner surface are provided, where the at least two interfacing regions are positioned such that the interfacing pressure force is angularly offset from the interference force of the deformation means. This may provide a mechanical advantage, or wedging effect. This wedging effect may increase the interface force resulting in increased tractive force. In an alternative embodiment, the cross sectional form may generate a reduced region of interface to provide an increased interface pressure that increases tractive force through the various means described above. A further embodiment may have an intermediate element between the sleeve inner surface and elongated member to provide any combination of the traction modifying methods described above.

Adhesives that activate on application of pressure may also be used to enhance tractive force. Also means of providing fusing and/or bonding of the elements initiated by application of interface pressure and/or motion at the interface. Various means may be provided to enable fusing and/or bonding. Non-limiting examples include; chemical adhesive, flux, metal plating, alloying elements, and chemical bonding.

In a yet further embodiment, the tractive force may be further altered by varying the degree of localised deformation or degree of embedment of the at least one deformation means into the elongated element.

As may be appreciated, combinations of the above may be used to alter the tractive force optionally along with other art methods.

In a further embodiment, during fitting of the deformation means, heat generated by friction during deformation may cause the at least one deformation means to weld to at least a portion of the sleeve and/or at least one elongated element. As may be appreciated, friction welding may further enhance the coupling strength and/or may help to distribute localised stresses away from the point(s) of deformation.

By contrast to friction welding, a reduction in the friction between the deformation means and either or both of the elongated elements and coupling sleeve may be desirable, for example, to reduce the force required to install the deformation means. A reduction in friction may have the advantage of either requiring a lesser amount of energy for installation than would otherwise be required, and/or allow a greater level of interference to be achieved for a given amount of installation energy.

The deformation means, sleeve or part thereof, elongated element or part thereof, and combinations of these parts may comprise at least one friction modifying means between the mating interference components to achieve a reduction in friction during fitting.

The at least one friction modifying means may be selected from: fluid lubricants, dry lubricants, surface coatings, surface finishes, and combinations thereof.

In a further embodiment the deformation means may act in combination with an adhesive additive acting between the outer surface of the elongated element and the inner surface of the sleeve. Further, the adhesive may be act between the deformation means and either or both of the elongated member and inner surface of the sleeve. The adhesive may be present in the sleeve prior to fitment of the elongated member, or be applied between the elements once fitted. Further, adhesive may be supplied into the orifice of the sleeve or upon fitment of the deformation means. One such adhesive may be a two component epoxy product in a glass (or other material) vial that could be preinstalled into the sleeve orifice. When the elongated element is installed or located into the orifice, the vial may be fractured releasing the adhesive.

The sleeve may be shaped in order to vary the physical properties of the sleeve and thereby alter the coupling dynamics. Shaping may include increasing or decreasing the sleeve wall width or inserting notches or channels in the sleeve wall to alter the properties. Physical properties referred to may include at least strength, ductility and/or modulus of elasticity. This design variation may be important in order to alter the level of strain induced in the sleeve along the sleeve length and between a series of deformation means and thereby alter the deformation process/profile. By way of example, tailoring the strain in the sleeve may be incorporated to match the elongated element deformation characteristics thereby increasing the coupling hold and decreasing potential localised stresses.

The sleeve may be formed with a cross sectional change at a location along the inside of the sleeve length forming a feature that the at least one elongated element abuts. For example, this may be integrated into the design to provide positive feedback to an installer on correct part alignment.

In one embodiment, the sleeve may be double ended and used to couple two elongated elements together in a substantially axial manner.

Alternatively, the sleeve may be shaped to couple a first elongated element and at least one additional non-elongated or elongated element, the elements joining in a non-axial manner.

In a further embodiment, the sleeve may couple to a single elongated element with another form of detail or connection type located on the sleeve.

The deformation means as described above may prior to coupling, take the form of a generally straight elongated member with a body and two opposing ends, one end being a leading end as described above and a second end being a following end. The leading end enters through the sleeve wall exterior and travels between the sleeve inner surface and adjacent outer surface of the at least one elongated element during fitting or coupling. The following end follows. In one embodiment, the following end may comprise a form or shape that extends outwardly beyond the cross-section width of the deformation means body. The following end may act to absorb motive energy of the deformation means during coupling. The following end may substantially halt movement of the deformation means during coupling. Alternative positions of a form or shape extending outwards beyond the cross-section with of the deformation means body are possible and reference to the shape at the follow end shall not be seen as limiting.

As may be appreciated, it is possible to vary the degree of localised deformation by varying the cross-sectional size of the at least one deformation means (termed hereafter as the diameter however noting that non-circular cross-section deformation means may also used with a similar principle applying). It is also possible to vary the degree of localised deformation by varying any gap between the sleeve and elongated element. These variations in cross-section size and gap if present alter the degree of embedment of the deformation means into the sleeve and/or elongated element at the point of localised deformation. The embedment referred to with respect to the above may be lateral embedment distance of the deformation means into the sleeve and/or elongated element. For clarity, the distance the deformation means is driven into the sleeve/elongated element gap along the deformation means longitudinal axis or body length is not encompassed in this embedment discussion.

The inventor's have found that there may be an important ratio between deformation means embedment distance and deformation means diameter that links to how the coupling device acts when a tractive force is applied across the coupling device. The two characteristics act together and not in isolation to cause the coupling effect. Without being bound by theory, it is the inventor's understanding that, when traction occurs on the coupling device to try and separate the sleeve and elongated element, material from the sleeve and/or elongated element ideally piles up or shears before the deformation means path of movement. As pile up occurs, the resistance to further traction movement increases and the coupling device retains its integrity, at least up to a desired maximum force. This mechanism represents a preferred minimum deformation means embedment to deformation means diameter ratio. By contrast, if the ratio of deformation means embedment to deformation means diameter falls below a minimum ratio, material from the sleeve and/or elongated element then flows around the deformation means leading to slippage and potentially coupling device failure at a point earlier than is the case in the preferred ratio noted above.

The ideal deformation means embedment to deformation means diameter ratio, termed hereafter as the pin embedment to pin diameter or PED ratio is somewhat variable depending on factors such as the number of deformation means used, the deformation means surface area that abuts the localised deformation area of the sleeve and/or elongated element and whether for example, modifications are used such as whether friction modifying means are used e.g. roughened surfaces. By way of example, the PED ratio may for example be at least 15, or 16, or 17, or 18, or 19, or 20, or 21, or 22, or 23, or 24, or 25, or 26, or 27, or 28, or 29, or 30%. For example, if the deformation means were a pin with an 8 mm diameter, the minimum desired level of embedment in the sleeve and/or elongated element may be at least 1.2 mm corresponding to at 15% PED ratio or 1.28 mm corresponding to a 16% PED ratio and so on.

The sleeve noted above may be formed so as to have multiple orifices and grooves (if present) accommodating a single deformation means in each orifice and coincident groove (if present). In an alternative embodiment, a plurality of deformation means may be fitted in a single sleeve orifice and groove if present.

Where multiple orifices and/or multiple deformation means are used, the orifices and deformation means may form an array once installed. The configuration of this array may be varied by one or more factors comprising: longitudinal spacing, angular variation, perimeter positioning, opposing positioning, varying interference, embedment length, self-energising geometry, friction modifying means, and combinations thereof. In addition or along with the above variations, additional changes or tailoring may be completed comprising:

varying the level of interference between the sleeve and the at least one elongated member for some or all of the deformation means with respect to each other;

varying the amount of wrap of each deformation means (assuming wrap occurs), from the tangential fitment through to multiple wraps, or anything in between;

varying the combination of 'fixed' deformation means and self energising deformation means.

An array may be useful as this allows tuning of the strain distribution between the elongation means and sleeve. This may allow optimisation of the capacity of the coupling and potentially reduce the number of deformation means. This may further allow spreading of the coupling load and minimise any point loading or stress. In one example where the load is varied via an array, one set of deformation means may be positioned to cause local deformation about a first plane on the elongated element while a second set of deformation means may be positioned to cause local deformation about a second or further plane(s) on the elongated element which in turn modifies where the elongated element is urged against the interior surface of the sleeve.

The tractive force of the array may be further altered by varying the degree of localised deformation or degree of embedment of the at least one deformation means into the elongated element along a series of deformation means. As may be appreciated, when the elongated element and sleeve undergo a tractive force the force concentration on a first deformation means about the sleeve opening may be higher than the force concentration about a deformation means further within the sleeve. This may be simply a result of elongated element deformation characteristics such as that measured via Young's modulus. The inventors have found that by varying the degree of localised deformation at each deformation means, it is possible to spread the stress and avoid localised high stress concentrations about the deformation means closer to the opening. In one embodiment, it may be advantageous to increase the degree of embodiment or local deformation for deformation means further away from the opening and decrease the degree of localised deformation closer to the opening. In the inventor's experience, it is the first two deformation means that incur the greatest stress and therefore these are often suitable candidates for reduced localised deformation while remaining deformation means may be embedded deeper. However other combinations may be beneficial for specific applications. Varied embedment could be achieved for example by using different size deformation means or by using different size grooves to which the deformation means may be fitted.

As noted above, it may also be advantageous to allow at least a degree of displacement of at least one deformation means in the array. As noted above, this may for example be achieved through use of a shaped groove in the sleeve interior wall that allows for a defined level of extension of a section or sections of the elongated member under elastic and/or plastic deformation before load transfer occurs via the deformation means. Such an array may use any combination of translating, self energising, or fixed deformation means actions. When configured in an array, any combination of deformation means energisation and self-energisation characteristics may be employed.

The use of an array of deformation means may be useful to accommodate variations in dimensional properties of the elongated element within a tolerance range. This may for example be achieved through varying the level of interference between sleeve and the at least one elongated member so that that at least one of the deformation means provides a level of interference to achieve the desired mechanical properties for the connection.

In one embodiment, the at least one deformation means may be at least one pin and the at least one elongated element may be steel reinforcing rod although, as should be appreciated, reference to reinforcing rod should not be seen as limiting since the same principles may be used to couple other elongated elements, one example being rope, another being plastic extrusions. Another example may be to connect wire rope cables. Another may be to connect gas lines or plumbing fittings. Another may be to connect electrical cabling. Another may be to connect legs for furniture such as tables. A yet further example may be to connect tent poles.

In a second aspect, there is provided a deformation means insertion tool, the tool comprising a driving mechanism to fit or force a deformation means into an interference fit between mating interference components, the tool providing support to at least the outer portion of the mating interference components as the deformation means is fitted.

The driving mechanism may use an impulse energy input to forcibly insert the deformation means into an interference fit. The interference fit may be between at least part of the inner surface of a sleeve and/or an adjacent outer surface of at least one elongated element in the coupling device noted above. That is, the act of insertion causes interference and local deformation between the at least one elongated element, the at least one deformation means and the sleeve. The level of force required by the tool to insert the deformation means may be a function of the degree of interference and/or the size of the deformation means. Multiple driving mechanisms may be used to insert the deformation means via the tool comprising for example: high energy projectile force, impulse force, percussion, screwing (twisting), continuous pressure (such as a press), compressed air, rapid combustion or explosive activation, and combinations thereof. The use of high energy impulse insertion tool, such as powered activation allows for rapid installation times, little required effort by the user and can be achieved with portable hand held devices. In one embodiment, the tool provides the deformation means with sufficient impulse energy to cause the deformation means to travel at a velocity of at least 50, or 75, or 100, or 125, or 150, or 175, or 200, or 225, or 250, or 275, or 300 m/s at the moment of exit from the tool or a part thereof. As should be appreciated, the term 'impulse energy input' may refer to a single impulse or multiple energy impulses. Further, as should be appreciated, an impulse energy input for the purposes of this specification may exclude threading or screwing the deformations means into an interference fit, although some degree of deformation means rotation during fitting may occur. Instead of helical threading, the at least one deformation means may predominantly be forced by the tool to slide between the sleeve and elongated element during fitting moving obstructing material away from the deformation means path of travel. The high energy of fitting imposed by the tool may be useful to impose the described interference fit and/or local deformation. Without being bound by theory, one reason for the effectiveness of the coupling produced may be that during insertion and under the high energy conditions noted, the material being deformed locally may become temporarily fluid in nature, hardening once the energy dissipates to a more cohesive interface than may be the case under low energy plastic deformation e.g. threading a screw into the elongated element.

The driving mechanism may drive the deformation means with a force, the force being sufficient to cause at least partial coupling. Partial coupling may be a result of the force being sufficient to cause at least partial deformation and/or engagement between the deformation means and at least one elongated element. In one embodiment, the force may be sufficient to avoid the deformation element inadvertently being removed from the coupled arrangement. During insertion, at least one friction modifying application means may be used between the deformation means and the mating interference components to achieve a reduction in friction during fitting. The at least one friction modifying means may be selected from application of: fluid lubricants, dry lubricants, surface coatings, surface finishes, and combinations thereof.

In a third aspect, there is provided a coupling sleeve, the sleeve comprising:
- a generally elongated shape with an opening therein the sleeve having an inner surface and the inner surface shape generally complementing the shape of at least one elongated element to be coupled; and
- wherein the sleeve has at least one orifice extending from the exterior of the sleeve to at least one groove or marking recessed into the sleeve inner surface.

Each independent orifice in the sleeve may be coincident with an internal groove.

The at least one groove in the sleeve may extend about at least part of the inner surface of the sleeve and the remainder of the inner surface may remain unformed.

The at least one groove in the sleeve may alternatively extend about the entire inner surface of the sleeve.

In a fourth aspect, there is provided a deformation means used to fit with interference between, and cause local deformation about at least part of the inner surface of the sleeve and/or an adjacent outer surface of the at least one elongated element to which the deformation means is fitted, thereby causing coupling of the sleeve and at least one elongated element, the deformation means comprising:
(a) a pin wherein the pin has a greater hardness than the opposing elements; and
(b) wherein the pin is formed so as to provide a self-energising action when fitted, acting to increase the interference with, and therefore interlocking of, the coupled opposing elements when subject to external loading.

As noted, the deformation means may be a pin.

The pin may be of approximately similar form along its length. The pin may have features placed along the pin length that vary the form. These may be localised, or have a gradual or step change on form. A pin may be formed with a 'head' or larger form. A pin may be formed with a contoured end to affect the insertion performance of the pin into a respective object.

The opposing elements may be a coupling sleeve and/or at least one elongated element. The deformation means may remain substantially unaffected in form or shape post fitting. The deformation means may be formed with an end detail that facilitates:
- Installation of the deformation means in a corresponding orifice.
- And encourages travel of the deformation means around the groove located on the inside of the coupling sleeve.
- That facilitates a flow of material in the zone of localised deformation of the elongated element and/or coupling sleeve. This may have the advantage or reducing the energy required to install.
- The deformation means and/or reducing stress concentration in the localised deformation zone, and/or enhancing the interference pressure between coupler sleeve, deformation means, and elongated element.

The deformation means may have a leading end detail that facilitates:
- Installation of the deformation means in a corresponding orifice in a sleeve; and/or
- Travel of the deformation means around a groove optionally located on part or all of the inside of the sleeve; and/or
- A flow of material in the zone of localised deformation of the elongated element and/or sleeve;
- A cutting detail or details on the deformation means such as a serrated edge that may for example shave material from the elongated element during coupling.

The deformation means may be formed with a surface finish and/or features that enhance; installation force, friction, friction welding, load transfer capability, traction effects, or any combination thereof.

The use of a friction modifying means may be incorporated in the above embodiment to enhance the magnitude of the friction effect.

The deformation means may, during fitting, generate sufficient heat by friction during deformation to cause the at least one deformation means to weld to at least a portion of the opposing element or elements. Friction welding may further enhance the coupling strength.

The pin may, prior to coupling, take the form of a generally straight elongated member with a body and two opposing ends, one end being a leading end as described above and a second end being a following end. The leading end enters the sleeve and elongated element interface first during fitting or coupling. The following end follows. In one embodiment, the following end may comprise a form or shape that extends outwardly beyond the cross-section width of the pin body. The following end may act to absorb motive energy of the pin during coupling. The following end may substantially halt movement of the pin during coupling. The pin form or shape may be a head or shaped form.

In a fifth aspect, there is provided a method of coupling at least one element, the method comprising the steps of:
(a) fitting a sleeve at least partially over at least part of at least one elongated element;
(b) fitting at least one deformation means between the sleeve and at least part of the elongated element;
wherein the at least one deformation means fits with interference between the sleeve and at least one elongated element and, when fitted, the at least one deformation means causes local deformation to at least part of the inner surface of the sleeve and an adjacent outer surface of the at least one elongated element.

The resulting deformation noted above may result in the formation of an indentation or channel in at least part of the element and/or sleeve such that an interfering/interlocking connection is formed between the sleeve and elongated element about the deformation means.

In a sixth aspect, there is provided a coupling device comprising:
- a sleeve with an inner surface that encloses at least part of at least one elongated element to be coupled;
- at least one elongated element, the at least one elongated element comprising at least one pre-formed indentation and/or indentation formed through combinations of material removal and material deformation orientated during coupling to be coincident with at least one orifice in the sleeve; and
- when coupled, at least one deformation means engage through the sleeve orifice and along the elongated element indentation.

The sleeve orifice diameter may be either larger, smaller or the same approximate diameter as the at least one deformation means.

The at least one indentation on the elongated element may be located eccentric to the elongated element longitudinal axis. The at least one indentation on the elongated element may be located about the elongated element circumference or part thereof. The at least one indentation may extend at least partially perpendicular to the elongated element longitudinal axis. The at least one indentation may extend at least partially perpendicular and at least partially along the elongated element longitudinal axis. The at least one indentation may proceed in a curvilinear pathway about the elongated element and/or sleeve longitudinal length.

The indentation size may be either larger, smaller or the same size or part thereof as the deformation means.

The combination of the sleeve groove and elongated element indentation may together form an orifice that receives the deformation means.

In this aspect, the at least one deformation means may simply be inserted into the common opening through the sleeve and elongated element with no driving means and retaining in place for example using a mechanical or chemical fastener. In alternative embodiments, the at least one deformation means may be retained in place by incorporating at least some section of deformation between the parts e.g. deformation of the deformation means (in full or in part); deformation of the sleeve (in full or in part); and/or deformation of the elongated element indentation or orifice (in full or in part).

The indentation in the elongated member may for example be formed prior to coupling by actions selected from drilling, punching, shearing, and machining. Alternatively, the indentation in the elongated member may be formed when the at least one deformation means is threaded (for example via a driving means). The indentation may be formed through material displacement.

The at least one deformation means in the above aspect may have features to locally shear the elongated element upon insertion of the deformation means, or have cutting features to machine material from the elongated element upon insertion of the deformation means. If cutting features are present then the deformation means may be fitted with a combination of a rotating motion about a longitudinal axis of the deformation means along with a longitudinal translation of the deformation means.

As may be appreciated, this sixth aspect may be used in part or in full in combination with the embodiments described in earlier aspects. For example, the elongated element may have one region absent of indentations and a further region along the elongated element longitudinal length that has indentations. Variation in the use or otherwise of different aspects above may help to tune the coupling system characteristics.

In summary, the above described coupling device, associated parts and a method of use thereof allows for one or more of the following advantages:

Coupling of elongated elements, with or without oddly shaped sections;

Fitting to an elongated element with or without oddly shaped sections;

Deforming a third element (or elements—the deformation means) potentially at least partially tangentially or radially around the elongated element to form an interference fit with the sleeve;

Alternatively, driving the third element or deformation means at least partially longitudinally along the element to form an interference fit with the sleeve;

The interference fit results in a pressure on the areas of the interface between the elongated element and sleeve in the region opposed to the interference region from the deformation means. This pressure on the interface area generates a tractive friction force enhancing the axial load capacity of the coupled system;

Friction modifying techniques may be used about the pressure zone to enhance the friction traction force;

The application of mechanical deformation features in the pressure zone to provide tractive embedment in the elongated element may increase axial capacity;

Use of a hard deformation means to cause local deformation;

The fit prevents relative axial movement of the elongated element relative to the sleeve for applied loads below the yield load of the elongated element determined by the cross sectional area and yield stress of the elongated element;

The fit limits (but not necessarily prevents) rotational movement of the elongated element relative to the sleeve;

The properties of the deformable element when coupled may achieve strain pick up along the length of the sleeve to provide positive load transfer between two elements—that is, where there is progressive increase in strain along the length of the sleeve coupling to provide proportionate sharing of the load transfer between multiple deformation means when multiple deformation means are provided;

A sleeve fitted with internal grooving may be used to accept and direct the deformation means;

A sleeve that includes variations to the wall thickness of the sleeve to allow it to grab onto the elongated element harder due to higher induced strains in the thinner regions of the sleeve;

Spacing of deformation means (and fitment) is optimised;

No end treatment such as threading is required to the elongated element unlike art methods;

The pattern of the grooving may be tuned to optimise coupling;

Non-perpendicular deformation may be completed including tangential deformation, radial deformation and longitudinal/axial deformation. This offers the ability to increase (or decrease) surface area of deformation thereby tuning the coupling strength.

The grooving may include a ramp portion such that the deformation means undergoes a wedging action on the elongated element as axial displacement occurs between elongated element and the sleeve. This may be useful in maintaining load capacity under Poisson effects.

The deformation means and grooves may be configured to provide a camming action of the deformation means in the groove as axial displacement occurs between the elongated element and sleeve element during loading.

The coupling device is small hence avoids the need for special design in reinforced concrete cages.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as of individually set forth.

Working Examples

For the purposes of the example below and for ease of reading, reference is made towards coupling reinforcing steel (being the elongated element or elements), the coupling sleeve being a tubular steel sleeve and the deformation means being nail shaped pins with a sharpened point and a head. This should not be seen as limiting as other applications may be also use the device, parts, tool or method described.

Figure 2:
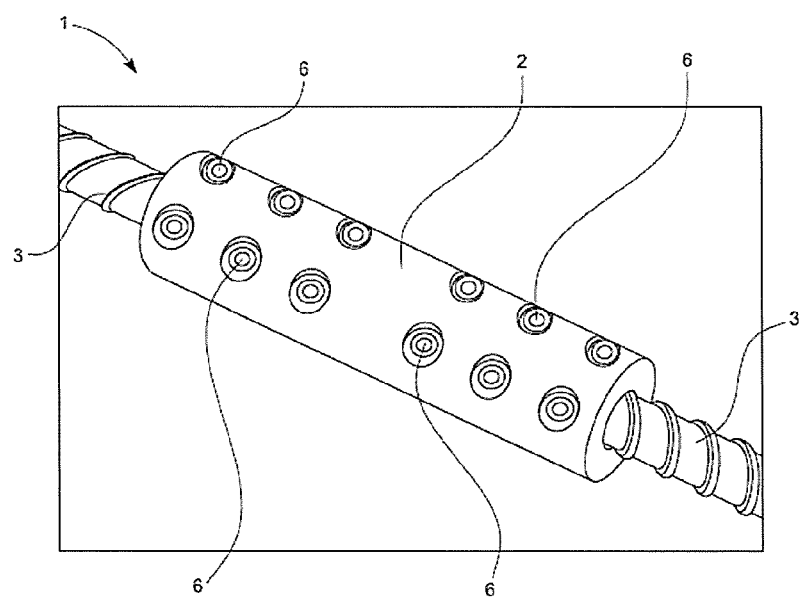
FIG. 2 illustrates an example of an assembled coupling using a sleeve and pins to couple two reinforcing steel bars.
Figure 3:
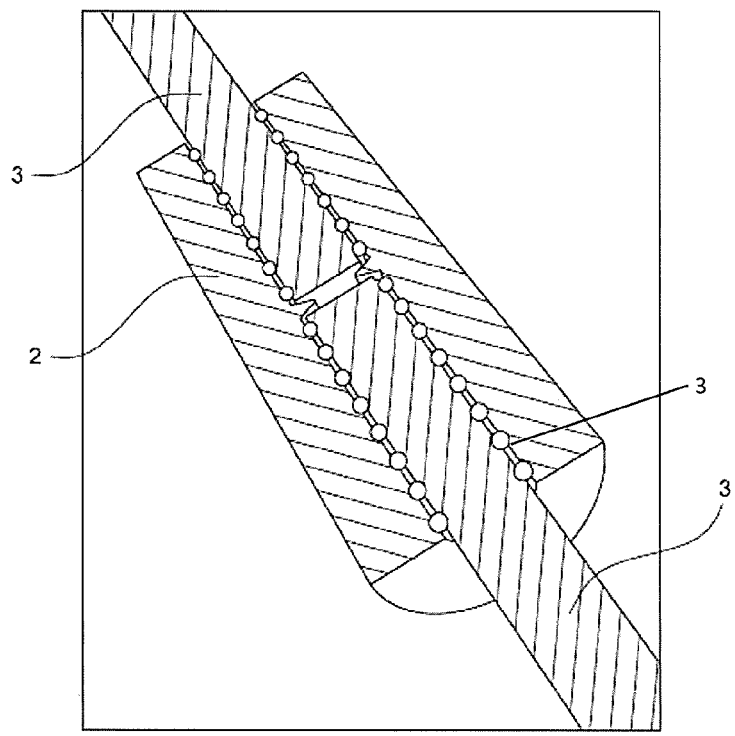
FIG. 3 illustrates a cross-section view of the assembled coupling of FIG. 2.

Referring to FIGS. 2 and 3, the inventors have designed a coupling device 1 consisting of a sleeve 2 into which the elongated element 3 or elements 3 to be coupled is/are inserted. In the embodiment shown in the Figures, the sleeve 2 is tubular with first and second ends. The elongated element 3 or elements 3 is/are elongated with first and second ends and a mid-section between the ends. Various rounded shapes or polygonal shapes may be used for the sleeve 2 and/or elongated element(s) 3 and the circular shapes shown are given by way of example only.

Figure 4:
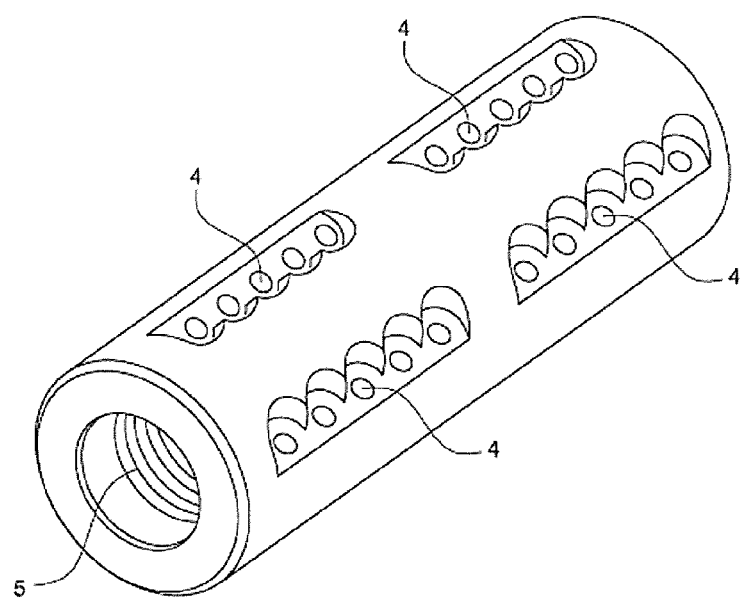
FIG. 4 illustrates an example of a coupling sleeve.
Figure 5:
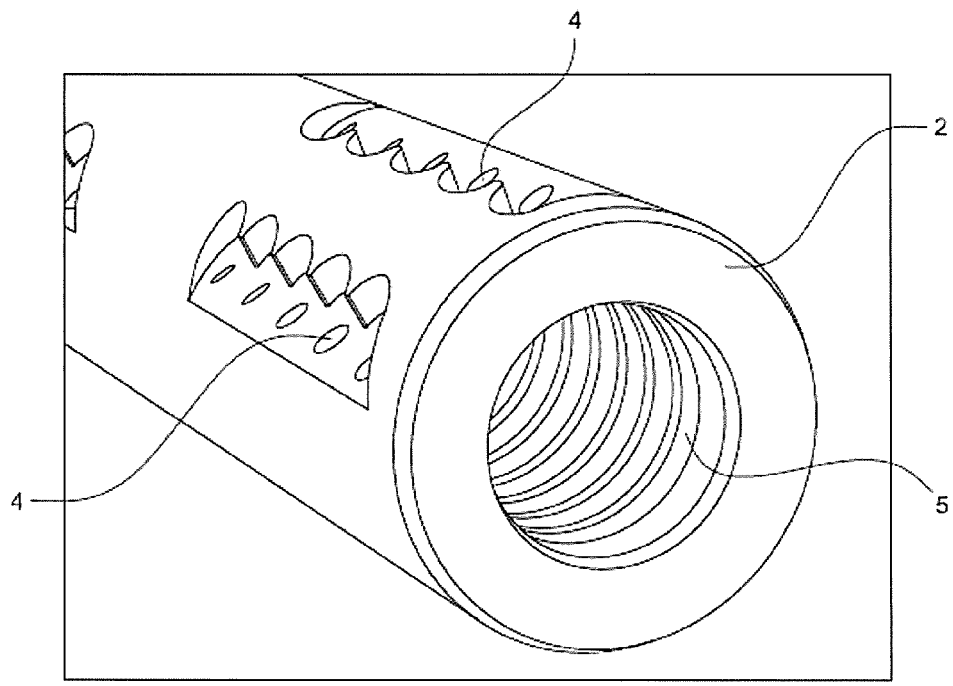
FIG. 5 illustrates an end view of the coupling sleeve.

The sleeve 2 may be fitted with one or more orifices 4 that in the embodiment shown are coincident with grooves 5 or markings located on the inner surface of the sleeve 2 shown in FIGS. 4 and 5. These orifices 4 and/or grooves 5 may be preformed before coupling or formed when the pin 6 is inserted.

The orifices 4 could be circular but equally could be other shapes. The grooves 5 located on the inner surface of the sleeve 2 may be coincident with the orifices 4 and may run around the entire inner perimeter surface of the sleeve 2, or may only be formed for a short length, thereby leaving the remainder of the surface unformed. Additionally there may be additional marking extrusions or depressions on the inner surface of the sleeve 2, however these are not a requirement. The overall shape of the inner surface of the sleeve 2 is formed to generally match that of the elongated element 3 to be coupled. For example if a generally round elongated element 3 is to be coupled, then the sleeve 2 surface may be made with a rounded cross section of sufficient size to allow the elongated element 3 to be freely inserted with a degree of tolerance. Likewise, a square cross sectional shape may be used for elongated elements 3 that have a generally square shape, etc. For unusual shaped objects, such as deformed reinforcing bars where deformations extrude from a generally circular bar elongated element 3, the inner surface of the sleeve 2 may simply remain round.

The elongated element 3 is slid or otherwise installed inside the sleeve 2 or vice versa to the desired location and then a series of deformation means being pins 6 are forced to pass through the orifices 4 in the outer sleeve 2 into the corresponding grooves 5 or marks. The sleeve may be slid or installed to cover an end or may cover a region of the mid-section of the elongated element 3 leaving the ends of the elongated element 3 exposed. The size and location of the orifices 4 and corresponding groove 5 is such that the pin 6 forms an interference fit with the sleeve 2 material and the elongated element 3 as it progresses through the orifice 4 and the groove 5. The pin or pins 6 embed in at least a part of the elongated element 3 in the pin 6 path of travel during insertion/coupling. This interference fit ensures the pin 6 follows the groove 5 and markings located within the sleeves 2. Once the pin or pins 6 are installed, the elongated element 3 is forcibly coupled with the sleeve 2.

Forcing the pins 6 into the orifices 4 may result in localised plastic deformation of the sleeve 2 and/or elongated element 3. Depending on the relative material properties of the sleeve 2 material, the pin 6, and the elongated element 3, this deformation could occur in any one, two, or all of the elongated elements. It is envisaged that the majority of the deformation will occur in the elongated element 3 through the use of higher strength and/or hardness materials in the pins 6 and sleeve 2, however any combination could be achieved. The localised deformation that occurs in the elongated elements 3 results in mechanical interlocking of the coupling device 1. The localised deformation may be partial embedment of the pin or pins 6 in either or both the sleeve 2 and/or elongated element 3.

Figure 6:
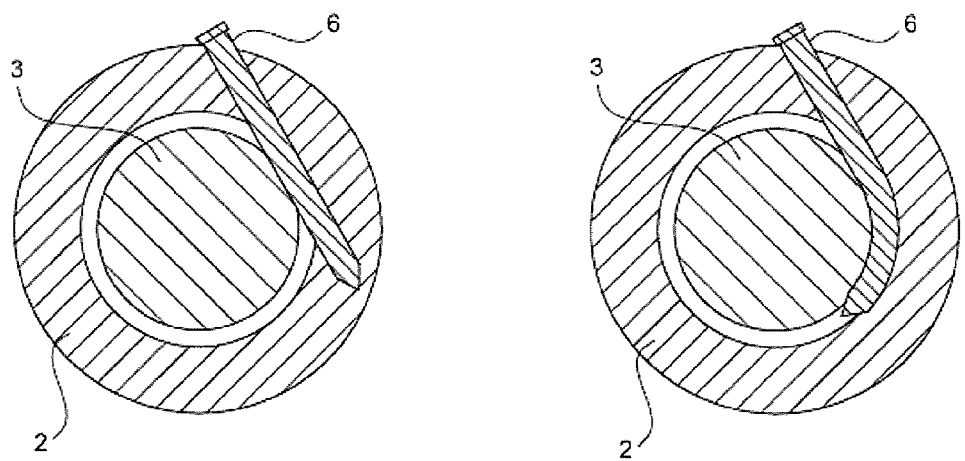
FIG. 6 illustrates two schematic cross-section views showing the path of travel of a pin between the elongated element and sleeve.

Depending on the relative location of the orifices 4 in the sleeve 2 material and the shape of the grooves 5 and marking used on the inner surface of the sleeve 2, the pins 6 can be forced to interfere with the elongated element 3 in different manners. Through configuration of the orifice 4 and groove 5 detail, a pin 6 may be applied tangentially near to the outer diameter of the elongated element—in this example being a reinforcing rod or bar 3 to either be forced tangentially across the elongated element 3 and extend out the other side of the sleeve 2 (FIG. 6 left hand side section drawing) (or equally stop short of protruding), or be forced to bend around the elongated element 3 (FIG. 6 right hand side section drawing).

Figure 7:
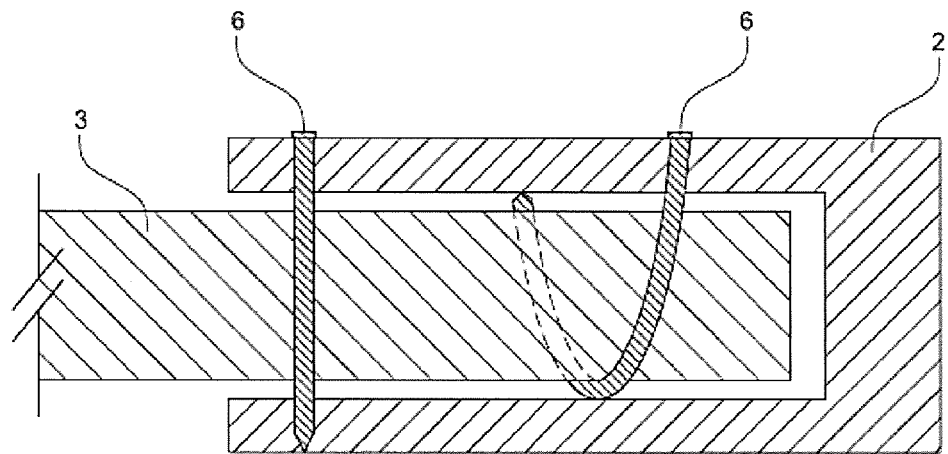
FIG. 7 illustrates a schematic cross-section view of an alternative pin path of travel between the elongated element and sleeve.

By varying the orientations of the grooves 5 and marking on the inside of the sleeve 2, the path and orientation of the pins 6 when installed can be altered. For example, the pins 6 could be formed around the circumference of the elongated element 3 and perpendicular to the axis of the elongated element 3 by using circular and radial groove 5 patterns. Equally, the pins 6 could bend around the radius of the elongated element 3 at an angle relative to the axis of the elongated element 3, or around a curvilinear pathway. Alternatively, the pins 6 could be forced through any potential combination of simple or complex profiles though the use of matching groove 5 patterns, an example being that shown in FIG. 7.

A further option is to drive the pin 6 axially between the elongated element 3 and the sleeve 2.

It can be seen that varying the shape and profile of the grooves and, therefore the shape of the formed pins 6, can alter the form of resistance that the pins 6 provide to the elongated element 3 relative to the sleeve 2. If the pins 6 form a radial pattern perpendicular to the axis of the bars they will provide strong resistance against relative axial movement between the sleeve 2 and the elongated element 3 however, they may not provide much resistance to rotational movement. This has considerable advantages for some applications where axial restraint is required but rotational movements are desired or allowed.

Figure 8:
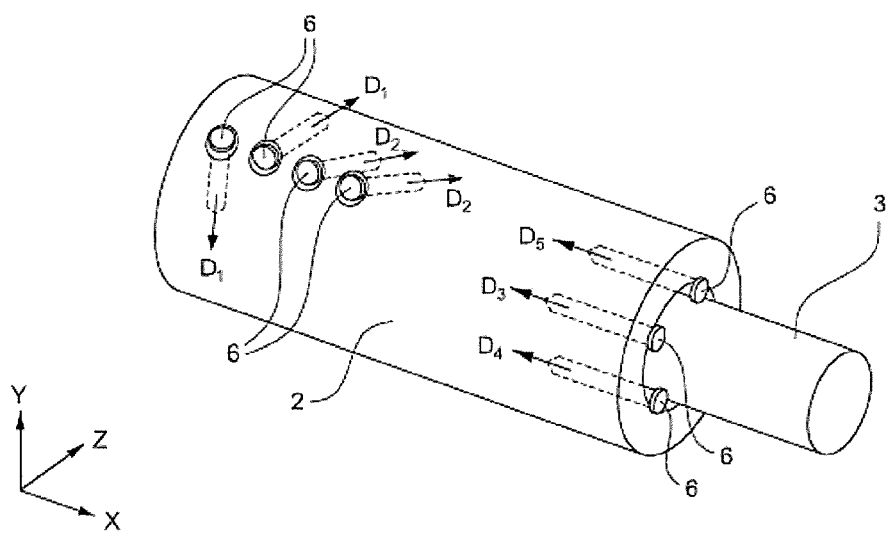
FIG. 8 illustrates the varying directions the pin may travel between the elongated element and sleeve.

Alternatively, if the interference occurs though orifices 4 located in the end of the sleeve 2 elongated element 3 or, the orifices 4 and grooves 5 result in the pins 6 being installed with interference parallel to the axis of the elongated element 3, then they will provide good restraint against relative rotational movement of the sleeve 2 and elongated element 3 but, may not provide sufficient axial restraint to prevent or limit movement under certain load combinations. It can also be seen that other forms of constraint against different movements may be obtained by forcing the pins 6 into the interface between the sleeve 2 and elongated element 3 at different angles. FIG. 8 illustrates examples of varying pin 6 orientations marked D1, D2, D3, D4, D5 from purely axial to directions purely orthogonal directions relative to the elongated element 3 longitudinal axis and variations between these extremes.

Figure 9:
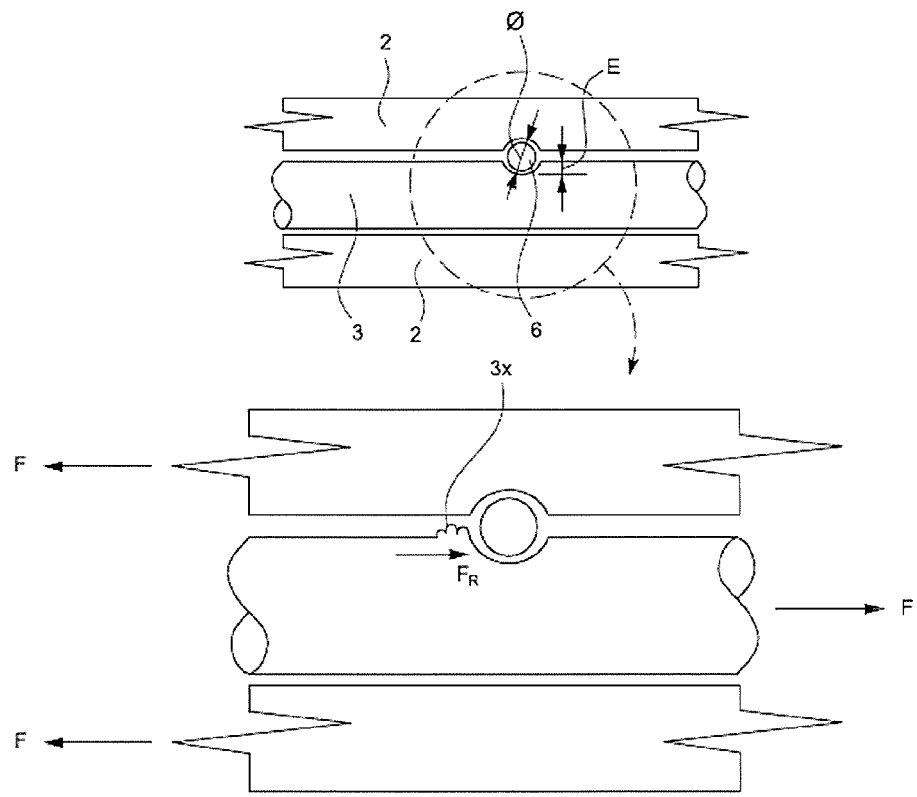
FIG. 9 illustrates an embodiment where pin embedment to diameter ratio are optimised.
Figure 10:
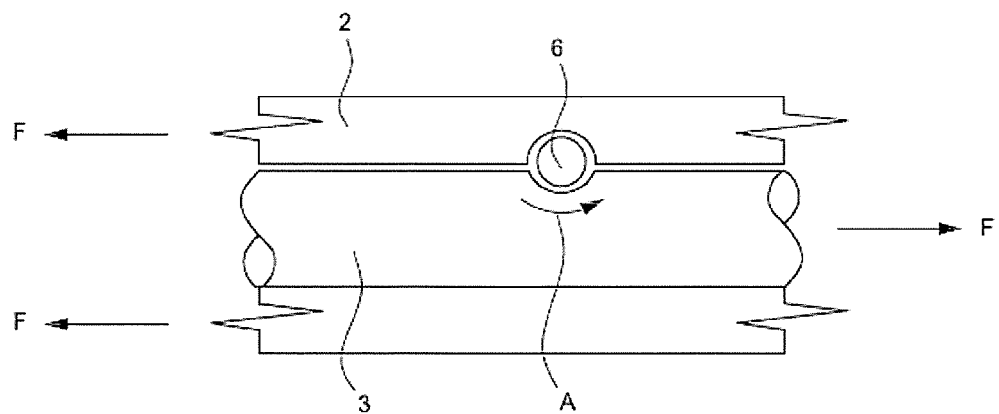
FIG. 10 illustrates an embodiment where the pin embedment to diameter ratio is insufficient leading to material flow.

The degree of restraint provided by the pins 6 against relative movement between the sleeve 2 and the elongated element 3 may also be a function of the degree of interference provided. Pins 6 which have a lesser interference/embedment into the sleeve and/or elongated element will provide less restraint against relative movement. This effect can be utilised to vary the degree of force taken on each pin 6 used in the system and the degree of relative movement prevented by each. Further, the ratio of pin 6 embedment E to diameter Ø (PED) may be important. FIG. 9 shows a preferred mechanism that is understood to occur where material piles up or shears (marked as item 3x) before a pin 6 when a tractive force F is applied to the elongated element 3 and sleeve 2. This scenario may represent a desirable result as it causes an opposing reaction force $F_R$ against the tractive force F thereby acting to increase the coupling reaction. If, as shown in FIG. 10, the PED ratio is insufficient, material may flow as per arrow A about the pin 6 instead of piling up as in FIG. 9 leading to possible uncoupling.

It can equally be seen that the degree of interference caused by each pin 6 around the exterior of the elongated element 3 may be varied by altering the depth of the grooving 5 or marking in the inner surface of the sleeve 2 member. This allows the pins 6 to apply greater or lesser pressure to certain areas of the sleeve 2 or elongated element 3 as desired.

The degree of restraint provided by the pins 6 against relative movement between the sleeve 2 and the elongated element 3 is also a function of the size and material properties of the pins 6. Larger pins 6 with a higher surface engagement are likely to provide a greater holding force relative to smaller pins 6. Likewise, pins 6 with stronger material properties may provide greater resistance to movement.

One key feature of the coupling device may be to allow variations in the number of pins 6 used in each application to form arrays. As may be appreciated, the use of more pins 6 will result in a greater total of interference between the sleeve 2 and the elongated element 3, likewise lesser pins 6 will reduce the total amount of interference. This makes the system very tuneable and adaptable for a variety of applications.

To illustrate the importance of the PED ratio and how this may be influenced by using a varying number of pins, the results of an experiment completed by the inventors is shown in Table 1 below.

TABLE 1

PED Ratio Versus Number of Pins For a Common Tractive Force

| PED % | 30% | 25% | 20% | 15% |
|---|---|---|---|---|
| 10 Pins | Grip | Grip | Grip | Slip |
| 8 Pins |  | Grip | Grip |  |
| 6 Pins |  |  | Slip |  |

As shown in Table 1, the higher number of pins and hence highest localised deformation surface area leads to greater resistance to a tractive force. The minimum PED ratio that results in gripping can be varied however would be at least 15-20% based on the above findings although as noted throughout this specification, the ratio could be adjusted or tuned through a variety of techniques beyond just number of deformation means e.g. use of friction modifying means.

Figure 11:
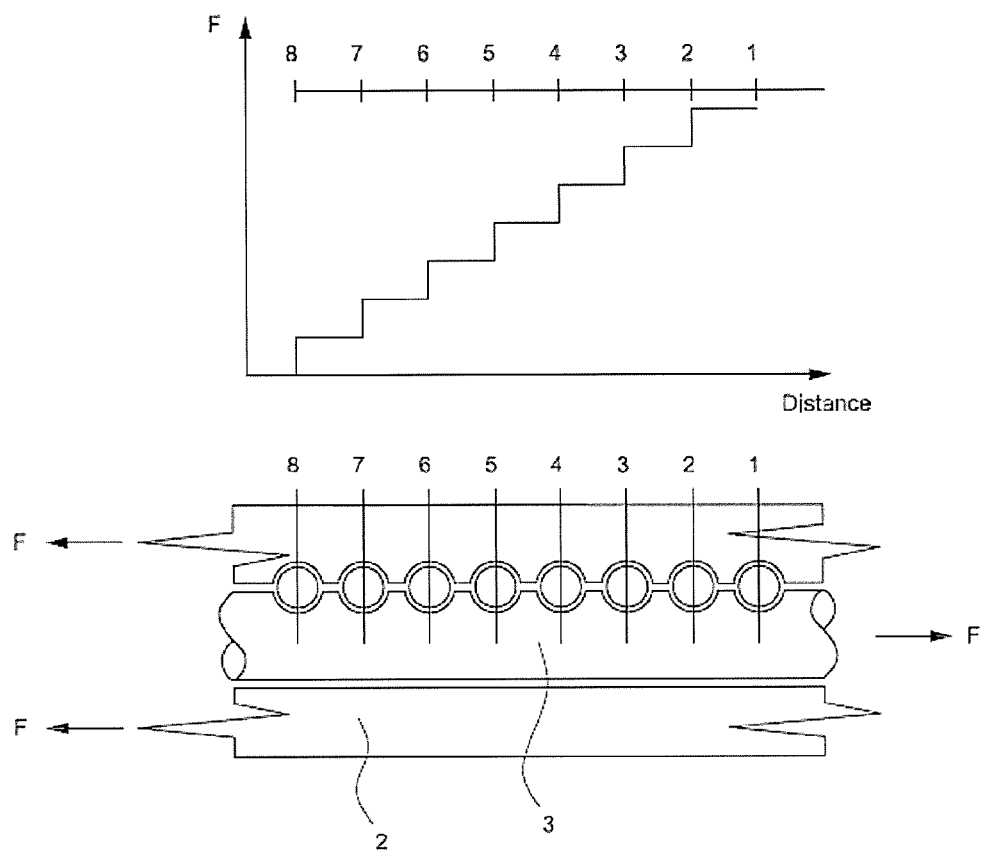
FIG. 11 illustrates an array of pins and how a tractive force applied to the coupling device results in varying imposed force on each pin in the array may vary along the array, the highest force being located about a sleeve opening.

The inventors have found that pins 6 closest to the sleeve opening (marked 1 and 2) may act on regions of the elongated element 3 transferring more tractive force than the regions of pins 6 marked 3 to 8 further inside the sleeve opening as shown in FIG. 11. Note the 8 pins are drawn but any number of pins may be used (or not used) as desired. The graph above the cross-section image of the coupling illustrates a potential force profile relative to distance (coupling length) across the various pins, the highest force experienced as noted above about pins 1 and 2 closest to the opening. The dynamics of this force graph may be altered.

Figure 12:
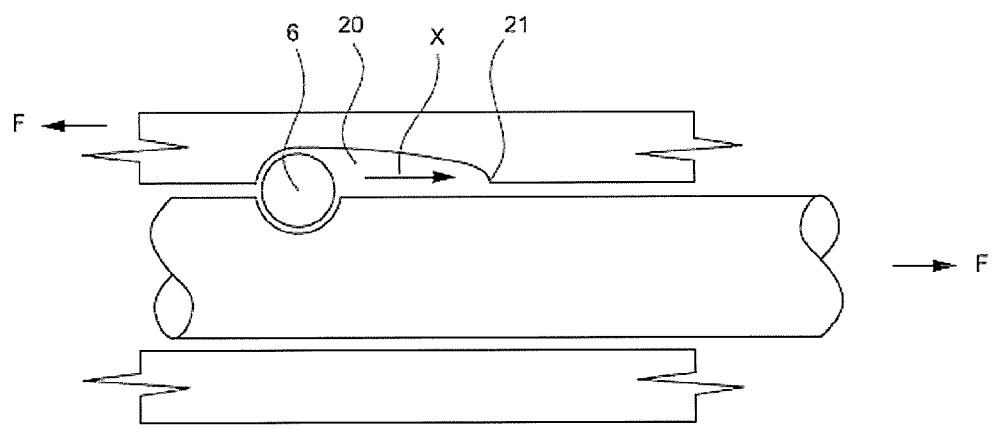
FIG. 12 illustrates how the tractive force on a pin may be manipulated in this case using an elongated groove to allow a degree of elongation movement of the coupling.

For example, the pin 6 diameter or embedment for example in pins 1 and 2 may be varied to that further within the sleeve as a means to spread the traction force F more evenly across all 8 pins and/or reduce stress concentration in the region of those pins 6. Alternatively, some degree of movement may be designed into the device. FIG. 12 shows how some axial elongation movement marked as arrow X of a pin 6 (energisation) may be allowed for under traction through use of a widened groove 20 in the sleeve 2 therefore reducing the resistance to a tractive force for the predetermined groove 20 length until the groove 20 ends 21 at which point the resistance to movement of the pin 6 returns.

The sleeve 2 noted above is formed with multiple independent orifices 4 and grooves 5, the orifice 4 openings being on the exterior surface of the sleeve 2 and each opening receiving a pin 6.

Figure 13:
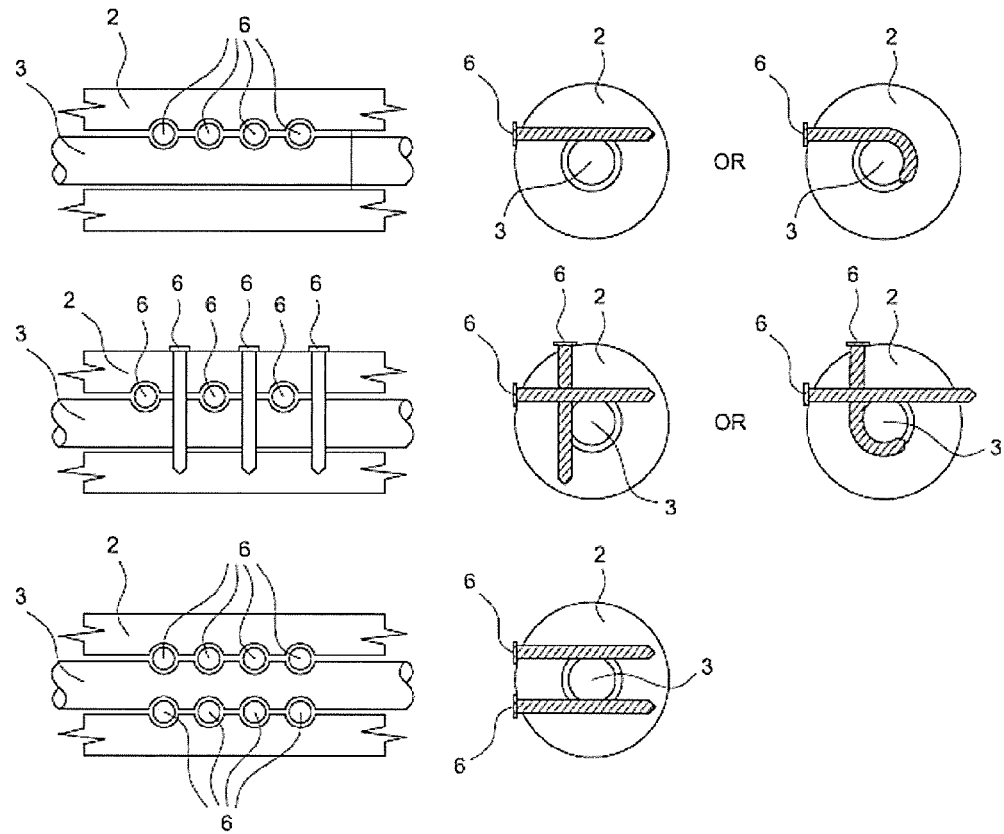
FIG. 13 illustrates different array configurations using multiple pins.

The arrangement of the orifices 4 and pins 6 form arrays once installed. The arrays may be varied through any of, or a combination of the following; longitudinal spacing, perimeter positioning, opposing positioning, varying interference, embedment length, self-energising geometry, and friction modifying means. Example arrays are illustrated in FIG. 13.

All of the features noted above regarding the orifices 4, the pins 6 and the grooving 5 can be treated individually or combined.

Variation to the geometry of the groove 5 may be desirable to allow the pin 6 to undergo a further energisation as the elongated element 3 undergoes axial deformation. In one configuration the groove may be formed with a ramped lead-out in the axial direction of the elongated element 3. When subject to axial deformation, the elongated element 3 would drag the pin 6 up the ramped portion, resulting in the pin 6 constricting down onto the elongated element 3. Depending on the chosen geometry, this may increase the interference with the elongated element 3, decrease it, or alternatively compensate for the sectional reduction due to the Poisson's effect. Other groove 5 geometries may be useful in achieving this result, such as a groove 5 and pin 6 of differing radius, or cam profiles for example.

Figure 14:
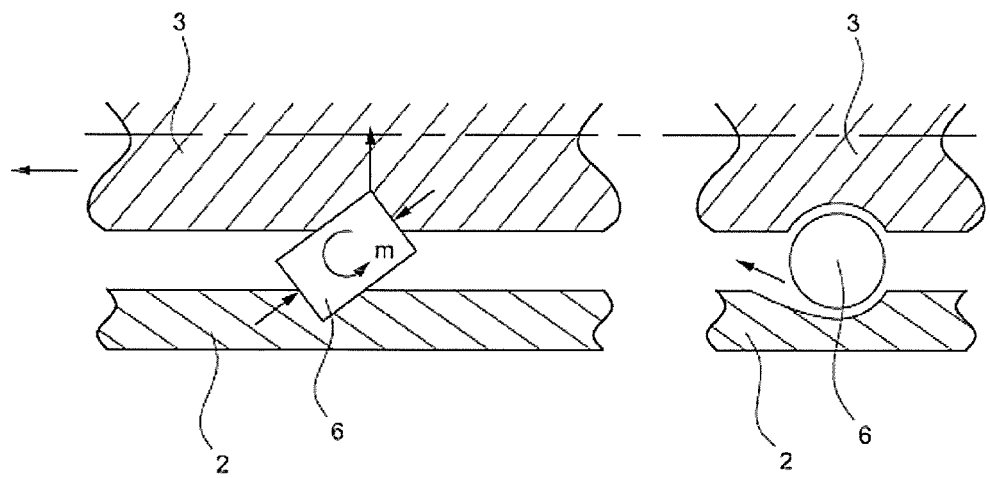
FIG. 14 illustrates an alternative schematic cross-section view of a pin and sleeve groove geometry.

In an alternative configuration, the pin 6 and groove 5 geometry may be formed such that the pin 6 is rectangular in cross-section and the groove 5 a V formation as shown in FIG. 14. Axial displacement of the elongated element 3 results in rotation of the pin 6, embedding the edge of the pin 6 further into the elongated element or bar 3. As with the above, this may increase load capacity of the interface and allow for compensation against the Poisson's effect. Other forms may be possible to achieve the same effect and a rectangular pin 6 form should not be seen as limiting. Equally this can be achieved through the use of specifically deformable pins 6 with variations in sectional properties when loaded axially and transversely.

The application of a pin 6 to couple an elongated element 3 to a sleeve 2 as described above may be configured such that a portion the external surface of the elongated element 3 and the internal surface of the sleeve 2 are brought into contact. This occurs in regions opposite the region of pin 6 interference, due to the pin 6 attempting to force the elongated element 3 away from the sleeve 2 in the interference region but be confined by the internal perimeter of the sleeve 2.

The resulting contact may occur with significant pressures resulting over the contacting interface area. The contacting interface area may be altered by altering the sleeve 2 shape. FIG. 15A shows how a concentric cross-section might work with the pin 6 imposing a force F causing a contacting interface about region 30. FIG. 15B shows a rib or bump 31 on the sleeve 2 cross-section shape and how the contacting interface 30 may be changed via this embodiment. FIG. 15C shows yet another variation where the sleeve 2 has a hollow 32 that causes two opposing interface positions 33, 34. As may be appreciated, this embodiment causes a wedging effect on the elongated element 3.

The result of this pressure about the contacting interface area is the generation of a tractive force in the axial direction of the elongated element 3 due to effects of friction resulting from the interface pressure. This friction force provides supplementary axial load capacity to the coupling device 1.

It can be seen that increasing this contribution may be desirable to increase the load bearing capacity of the coupling device 1. An increase may be achieved through selection of interfacing material, the use of a higher friction inlay between the elongated element 3 and sleeve 2, traction enhancing compounds, and/or surface finishes. Further, traction may be enhanced through the gross deformation of the elongated element 3 surface and/or the sleeve 2 surface to generate a localised interlocking interface.

An example of this may be the application of a series of saw-tooth shaped serrations (not shown) along the length of the sleeve 2 inner surface. Upon insertion of the pins 6, the elongated element 3 bears onto the serrations and engages with there under the applied pressure of the pin 6 interference. Load capacity is enhanced through the need to shear the serrated interlocks from either the elongated element of sleeve 2.

As noted previously, when the elongated element 3 is subjected to relatively high loads the elongated element stretches and reduces in cross sectional area. This relative change in properties happens progressively along the elongated element 3 as it transfers more load into the sleeve 2 through the pins 6. The design of the coupling device 1 developed allows this load transfer mechanism to be carefully controlled by the relative location of the pins 6 along the length of the sleeve 2, the number of pins 6, the size of the pins 6 used, the material properties of the pins 6, the orientation of the pins 6, the degree of interference caused by each pin 6, the geometry of the pin 6 and grooves 5, an energising action of the pin 6 as it moves relative to the groove 5, radial deformation of the coupling device 1, the localised deformation of the elongated element 3, friction of the abutting interface, friction welding by the pin 6, cross sectional variations in the sleeve 2 due to Poisson's effect, and traction modifying means. These key features allow the system to be used to minimise stress concentrations, to match the properties of the coupled materials (e.g. the sleeve 2 or elongated element 3 materials), and to ensure the coupled region is not weakened below that of the material used in the elongated element 3.

For example, in reinforced concrete, it is important that a coupled reinforcing bar 3 has a similar stress-strain characteristic as the parent material. It is also important that the coupled region is ultimately stronger than that of the parent material of the elongated element thereby forcing any fracture to occur away from the location of the coupling device 1. This can be achieved by varying the above listed variables to closely match the properties of the parent reinforcing bar 3 and without introducing areas of high stress concentration, examples of stress strain characteristics illustrated in FIG. 16.

A number of the examples above used the example of the pins 6 deforming the sleeve and/or elongated element as the pin 6 is inserted. It will be recognised that equally the pins 6 could be deformed as they are inserted or alternatively the sleeve 2 material in the area surrounding the grooving 5 for the pins 6 could deform. This deformation could be elastic but is likely to include both plastic and elastic deformations.

The pins 6 may have a head or other widened shape or form at a point or points along the pin 6 elongated length. The head or widened shape or form may slow or prevent unwanted insertion e.g. over insertion into an orifice 4 or groove 5.

A cover or covers (not shown) may be placed over any openings so as to prevent ingress or egress into or out of the sleeve 2 and elongated element 3.

Variations to Sleeve Wall Properties:

The sleeve 2 forms a critical component to the function of the coupler device. The use of orifices 4 for the pins 6 in the sleeve 2 does not introduce large cut outs or stress concentrations in the sleeve 2 body. This thereby allows the wall thickness of the sleeve 2 to be minimised when necessary.

If required, the sleeve 2 body can be shaped with additional cut outs, grooves 5, slots, holes, etc. in order to weaken the system. Equally the wall thickness of the sleeve 2 can be varied both along the length of the sleeve 2 and around the circumference as illustrated in FIG. 16. Additionally, the material properties of the sleeve 2 can be varied along the length. This can be important if it is required for the sleeve 2 to match the strength and stiffness of the elongated element 3.

Installing the Pins:

The pins 6 are forcibly inserted into the orifices 4 causing interference between the elongated element 3, the pin 6 and the sleeve 2. The level of force required to insert the pins 6 is a function of the degree of interference and the size of the pins 6. Multiple methods exist to insert the pins 6 including percussion, screwing (twisting), continuous pressure (such as a press), compressed air, rapid combustion or explosive activation, and combinations thereof.

The use of high pressure installation methods, such as powered activation allow for rapid installation times, little required effort by the user and can be achieved with portable hand held devices. Ideally the tool used to complete the installation will provide support for the outer sleeve 2 as the pin 6 is installed and also provides support for the pin (or pins) 6 as they are driven in.

Optimising the available energy to install a pin 6 may be desirable, to achieve the maximum possible drive-in length, for example. The use of friction modifying means between the pin 6 and the mating interference components may be utilised to achieve a reduction in friction, providing greater energy availability for generating pin 6 interference. Means such as fluid lubricants, or dry lubricants may be applied to the interfacing elongated elements to reduce friction. Other benefits may be achieved by material choice, surface finish, or metallic plating.

Positive End Stop for Compression:

Optionally, the outer sleeve 2 can be formed with a cross section formed to provide an abutment 7 at some location along its length to which the elongated element 3 is inserted until it touches. If the coupling device 1 is designed to join to a single elongated element 3 the solid cross section 7 may be near the end of the sleeve 2 (see FIG. 17A left hand side for example), however if two elongated elements 3 are to be coupled together in a generally axial orientation, then the solid cross section 7 may occur near the middle of the sleeve 2 (see FIG. 17B right hand side for example). Whilst having a solid cross section 7 in the sleeve 2 can occur it is not a functional requirement for the sleeve 2 coupling device 1.

Initial Hold and Install Indicators

Figure 18:
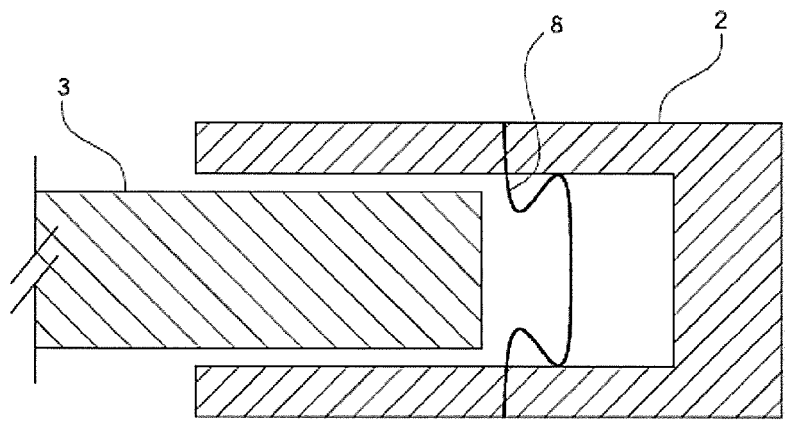
FIG. 18 illustrates a schematic view of a further variation in sleeve design using secondary elements.

The outer sleeve 2 may also be fitted with one or more secondary elongated elements 8, for example as per that shown in FIG. 18. These secondary elongated elements 8 are placed with the majority inside of the sleeve 2 and are required to deform out of the way as the elongated element 3 is installed. Once the elongated element 3 is installed they then provide a degree of resistance to extraction of the elongated element 3 and may provide a visual indicator that the elongated element has been installed past their location. The shape of the secondary elongated elements 8 is such that as the elongated element 3 passes across them it forces at least one component of the secondary elongated element 8 to extrude from the outer surface of the sleeve 2 or to pull back inside the outer surface of the sleeve 2. It is envisaged that at least one of these secondary elongated elements 8 will be located near the maximum insertion requirement for the elongated element 3 into the sleeve 2, thereby once it has extruded through the surface of the sleeve 2 will provide a visual indicator that the elongated element 3 has been installed a sufficient distance into the sleeve 2.

The outer sleeve 2 is sized so that the elongated element 3 can be simply installed with low force. No special preparation or treatment will be required on the elongated element 3 prior to installation.

Alternative Coupling

Figure 19:
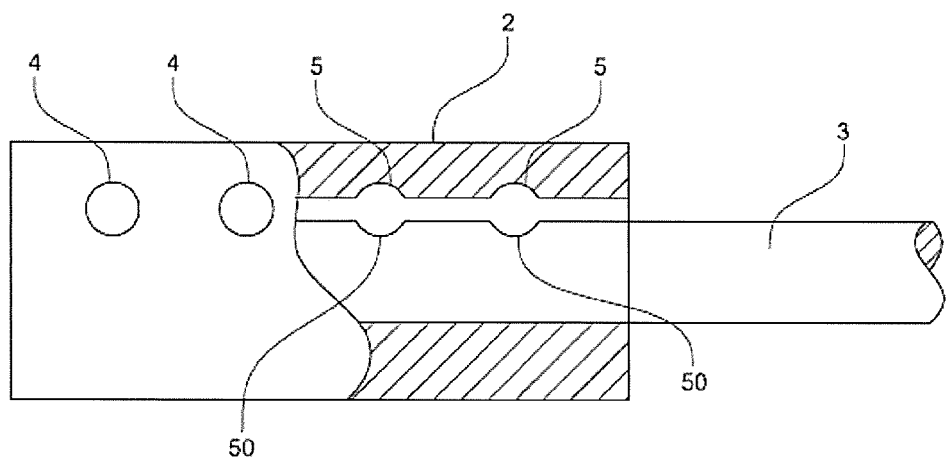
FIG. 19 illustrates a partial section side view of a further embodiment utilising a sleeve and elongated means (a rod), the sleeve and rod shown ready for coupling, the sleeve and rod in the embodiment shown having pre-formed indentations.
Figure 20:
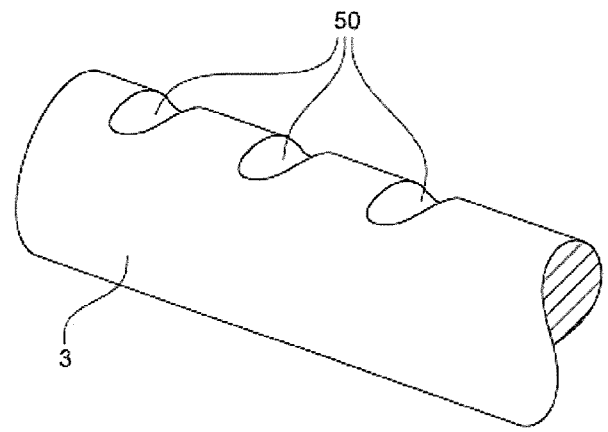
FIG. 20 illustrates a perspective view of the rod of FIG. 19 removed from the sleeve to further show the pre-formed indentations in the rod exterior.
Figure 21:
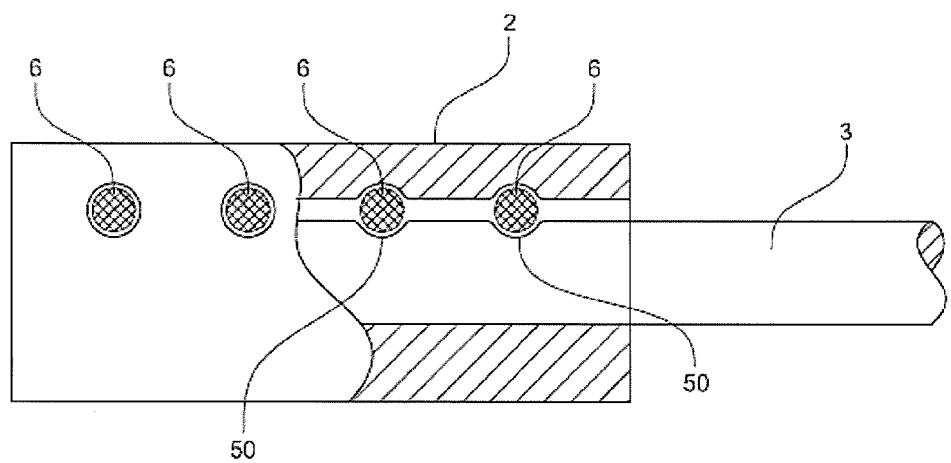
FIG. 21 illustrates the embodiment of FIGS. 19 and 20 above with the deformations means (pins) inserted.

The coupling 1 can take a different embodiment as illustrated in FIGS. 19 to 21 where the elongated element 3, shown as a rod 3, has pre-formed indentations 50 about the rod 3 surface. These indentations 50 may be used in lieu of, or with, the grooves 5 noted above in the sleeve 2. The indentations 50 may instead be orifices (not shown) in the rod 3, typically towards the outer surface of the rod 3 and eccentric from the longitudinal axis of the rod 3. In this coupling embodiment, the deformation means 6, (shown as pins 6) may be driven between the sleeve 2 and rod 3 guided via the grooves 5/indentations 50 thereby causing interference when a drawing force is applied on the rod 3 attempting to draw the rod 3 from the sleeve 2. As shown in at least FIG. 21, the resulting opening presented to the deformation means or pins 6 may be approximately the same diameter as the pins 6 although the diameter may be larger, smaller or variable along the pin 6 length (not shown) as it travels between the sleeve 2 and elongated element 3. There may for example be no deformation along the pin 6 length in this embodiment although this could be tailored to suit—for example by having a level of deformation at some point along the pin 6 length, if only to help retain the pin 6 in a coupled arrangement. Adhesives, packing or other methods (not shown) may be used to cause retention/deformation beyond just using the sleeve 2 and/or elongated element 3.

Applications

Figure 22:
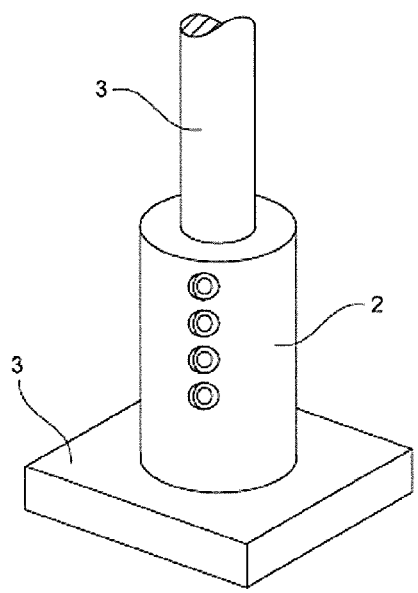
FIG. 22 illustrates a perspective view of a footplate type connector embodiment, the sleeve coupling an elongated rod to a foot plate, the foot plate providing an attachment feature for welding of fastening to other elements, or for embedment in concrete.
Figure 23:
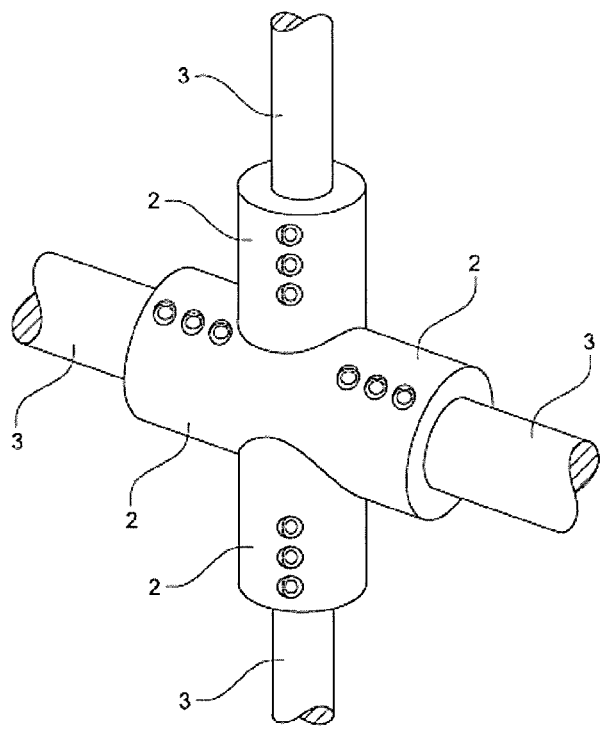
FIG. 23 illustrates a perspective view of a junction showing how the sleeve can be used to link together multiple elongated elements.

The coupler device defined above has the potential to couple a sleeve 2 to an elongated element 3 with a high degree of force such that the material properties of the elongated element 3 can also be matched. This will allow the coupled elongated element to undergo high levels of plastic deformation, with limited variation in performance when compared to the performance of the elongated element alone. The sleeve 2 that is coupled has the potential to take varying shapes and have varying applications. The sleeve 2 may be double ended and therefore used to couple two elongated elements 3 together in a relatively axial manner. Equally the sleeves 2 may accept more than two connecting elongated elements 3, with the elongated elements 3 joining in a non-axial manner. FIG. 22 for example illustrates a perspective view of a footplate type connector embodiment, the sleeve 2 coupling an elongated rod 3 to a foot plate 3, the foot plate 3 having an elongated rod (not shown) welded to the footplate 3. FIG. 23 illustrates a perspective view of a junction showing how the sleeve 2 can be used to link together multiple elongated elements 3.

Figure 24:
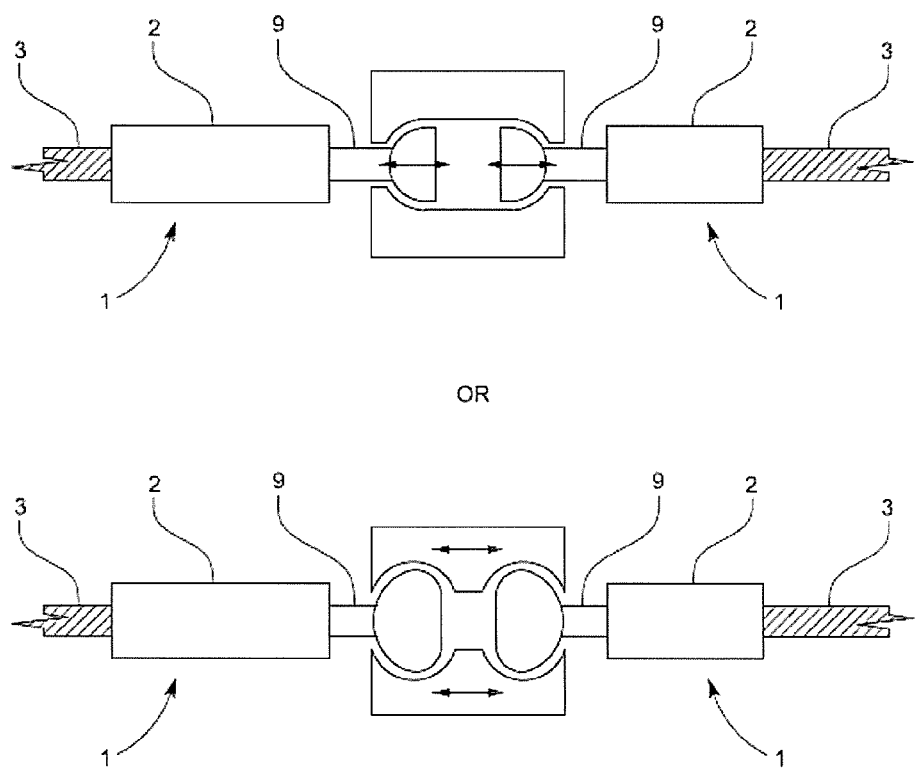
FIG. 24 illustrates a further schematic of a variation in coupling design, this connection type utilising a detail with a curvilinear surface that can be adjusted axially along the length of the connector and a third connecting element that joins across the two curvilinear surfaces when spaced the desired axial distance.

The sleeve 2 may also only join to a single elongated element 3 with another form of detail 9 or connection type located on the sleeve 2. Once such connection type 9 may be a detail that allows two or more such connection types to join when axially misaligned by having tolerance for misalignment in the three separate coordinates (x, y, z) as well as an angular misalignment. This connection type may utilise a detail 9 with a curvilinear surface that can be adjusted axially along the length of the connector and a third connecting elongated element 3 that joins across the two curvilinear surfaces when spaced the desired axial distance, one example being that shown in FIG. 24. Alternatively, the third connecting elongated element 3 may be able to be adjusted axially so as to provide the correct fitment between the two curvilinear surfaces.

Aspects of the coupling device 1, associated parts and a method of use thereof have been described by way of example only and it should be appreciated that modifications and additions may be made thereto without departing from the scope of the claims herein.

What is claimed is:

1. A reinforcing bar coupling assembly comprising:
   a sleeve with an inner surface that encloses at least part of at least one reinforcing bar when coupled with the at least one reinforcing bar; and
   at least one pin having a body and two opposing ends fitted with interference between, and causing:
      local plastic deformation about, at least part of the inner surface of the sleeve;
      local plastic deformation about, at least part of an adjacent outer surface of the at least one reinforcing bar; or
      local plastic deformation about, at least part of the inner surface of the sleeve and an adjacent outer surface of the at least one reinforcing bar;
   when coupled with the at least one reinforcing bar, where at least part of the body of the at least one pin is in contact with at least part of the inner surface of the sleeve and the outer surface of the at least one reinforcing bar when coupled with the at least one reinforcing bar and wherein local plastic deformation results in mechanical interlocking of the coupling assembly; and
   wherein the at least one pin is inserted tangentially and orthogonally to the longitudinal length of the at least one reinforcing bar between the inner surface of the sleeve and the adjacent outer surface of the at least one reinforcing bar when coupled with the at least one reinforcing bar.

2. The reinforcing bar coupling assembly as claimed in claim 1 wherein adhesive is located between the inner surface of the sleeve and the outer surface of the at least one reinforcing bar, the adhesive fusing and/or bonding the at least one pin and either, or both, the inner surface of the sleeve, or the outer surface of the at least one reinforcing bar.

3. The reinforcing bar coupling assembly as claimed in claim 2 wherein the adhesive is selected from: chemical adhesive, flux, metal plating, alloying elements, and chemical bonding.

4. The reinforcing bar coupling assembly as claimed in claim 1 wherein the at least one pin and sleeve inner surface and/or at least one reinforcing bar outer surface are configured to provide a camming action of the at least one pin relative to the sleeve inner surface and/or at least one reinforcing bar outer surface, as axial displacement occurs between the at least one reinforcing bar and sleeve during axial loading of the reinforcing bar coupling assembly.

5. The reinforcing bar coupling assembly as claimed in claim 4 wherein the camming action increases interference between the at least one pin and the at least one reinforcing bar.

6. The reinforcing bar coupling assembly as claimed in claim 4 wherein the camming action decreases interference between the at least one pin and the at least one reinforcing bar.

7. The reinforcing bar coupling assembly as claimed in claim 4 wherein the camming action results in rotation of the at least one pin on application of an axial force, embedding an edge of the at least one pin further into the at least one reinforcing bar.

8. A method of assembling a reinforcing bar coupling assembly comprising:
   providing a sleeve with an inner surface;
   inserting at least part of at least one reinforcing bar into the sleeve so that the inner surface of the sleeve encloses at least part of the at least one reinforcing bar; and
   fitting with interference, at least one pin having a body and two opposing ends between the sleeve and at least one reinforcing bar, causing:
      local plastic deformation about, at least part of the inner surface of the sleeve;
      local plastic deformation about, at least part of an adjacent outer surface of the at least one reinforcing bar; or
      local plastic deformation about, at least part of the inner surface of the sleeve and an adjacent outer surface of the at least one reinforcing bar;
   wherein, once fitted, at least part of the body of the at least one pin is in contact with at least part of the inner surface of the sleeve and an outer surface of the at least one reinforcing bar and wherein local plastic deformation results in mechanical interlocking of the coupling assembly; and
   wherein the at least one pin is fitted tangentially and orthogonally to the longitudinal length of the at least one reinforcing bar between the inner surface of the sleeve and the adjacent outer surface of the at least one reinforcing bar.

9. A coupler configured to couple together reinforcing bar ends, the coupler comprising:
   a sleeve with an inner surface that encloses, coaxially, an end of a reinforcing bar to be coupled; and
   an array of pins configured to mechanically interlock the sleeve and reinforcing bar end, the pins fitted, with interference, tangentially and generally orthogonally to the longitudinal length of the reinforcing bar end, between the sleeve inner surface and reinforcing bar end so that the pins in the array, on fitting, cause local-plastic deformation about part of an outer surface of the reinforcing bar end.

10. The coupler as claimed in claim 9 wherein adhesive is located between the inner surface of the sleeve and the outer surface of the at least one reinforcing bar, the adhesive fusing and/or bonding the at least one pin and either, or both, the inner surface of the sleeve, or the outer surface of the at least one reinforcing bar.

11. The coupler as claimed in claim 10 wherein the adhesive is present in the sleeve prior to fitment of the at least one reinforcing bar into the sleeve.

12. The coupler as claimed in claim 10 wherein the adhesive is applied between the sleeve and the at least one reinforcing bar after fitment of the at least one reinforcing bar into the sleeve.

13. The coupler as claimed in claim 9 wherein the at least one pin and sleeve inner surface and/or at least one reinforcing bar outer surface are configured to provide a camming action of the at least one pin relative to the sleeve inner surface and/or at least one reinforcing bar outer surface, as axial displacement occurs between the at least one reinforcing bar and sleeve during axial loading of the reinforcing bar coupling assembly.

14. The coupler as claimed in claim 13 wherein the camming action increases interference between the at least one pin and the at least one reinforcing bar.

15. The coupler as claimed in claim 13 wherein the camming action decreases interference between the at least one pin and the at least one reinforcing bar.

16. The coupler as claimed in claim 13 wherein the camming action results in rotation of the at least one pin on application of an axial force, embedding an edge of the at least one pin further into the at least one reinforcing bar.

17. The coupler as claimed in claim 13 wherein at least one pin in the array, prior to fitting, has a generally straight elongated and slender form along its body and two opposing ends and, at least one further pin in the array, prior to fitting, has a shape configured to provide a camming action.

18. A method of coupling a reinforcing bar to a coupler, the method comprising the steps of:
   providing a coupler in the form of a sleeve having an inner surface;
   inserting an end of a reinforcing bar to be coupled into the sleeve, the reinforcing bar end being coaxially aligned with a longitudinal axis of the coupler sleeve; and
   fitting an array of pins, with interference, tangentially and generally orthogonally to the longitudinal length of the reinforcing bar, between the sleeve interior face and reinforcing bar end, so that the pins in the array cause local-plastic deformation about part of an outer surface of the reinforcing bar, the pin array mechanically interlocking the sleeve and reinforcing bar end together.

19. The method as claimed in claim 18 wherein prior to fitment of the at least one reinforcing bar into the sleeve, adhesive is located between the inner surface of the sleeve and the outer surface of the at least one reinforcing bar, the adhesive configured to fuse and/or bond the at least one pin and either, or both, the inner surface of the sleeve, or the outer surface of the at least one reinforcing bar.

20. The method as claimed in claim 18 wherein the at least one pin and sleeve inner surface and/or at least one reinforcing bar outer surface are configured to provide a camming action of the at least one pin relative to the sleeve inner surface and/or at least one reinforcing bar outer surface, as axial displacement occurs between the at least one reinforcing bar and sleeve during axial loading of the reinforcing bar coupling assembly.

* * * * *